US010122708B2

(12) United States Patent
Smith et al.

(10) Patent No.: US 10,122,708 B2
(45) Date of Patent: Nov. 6, 2018

(54) SYSTEMS AND METHODS FOR DEPLOYMENT OF MISSION PLANS USING ACCESS CONTROL TECHNOLOGIES

(71) Applicant: HARRIS CORPORATION, Melbourne, FL (US)

(72) Inventors: Wayne B. Smith, Melbourne Beach, FL (US); Margaret Knepper, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 727 days.

(21) Appl. No.: 14/086,431

(22) Filed: Nov. 21, 2013

(65) Prior Publication Data

US 2016/0204934 A1  Jul. 14, 2016

(51) Int. Cl.
 H04L 9/32 (2006.01)
 H04L 29/06 (2006.01)
 (Continued)

(52) U.S. Cl.
 CPC ........ H04L 63/0853 (2013.01); H04L 9/0877 (2013.01); H04L 41/0893 (2013.01);
 (Continued)

(58) Field of Classification Search
 CPC .............. H04L 9/0819; H04L 41/0803; H04L 63/0853; H04L 63/10
 See application file for complete search history.

(56) References Cited

U.S. PATENT DOCUMENTS 5,278,570 A 1/1994 Jaramillo et al.
5,734,649 A 3/1998 Carvey et al.
(Continued)

FOREIGN PATENT DOCUMENTS

CN 1173256 2/1998
JP 2008177714 A 7/2008
(Continued)

OTHER PUBLICATIONS

Zhao, C., Jia, C., & Lin, K. (Oct. 2010). Technique and Application of End-Hopping in Network Defense. In Cryptography and Network Security, Data Mining and Knowledge Discovery, E-Commerce & Its Applications and Embedded Systems (CDEE), 2010 First ACIS International Symposium on (pp. 266-270). IEEE.
(Continued)

*Primary Examiner* — Khoi V Le
(74) *Attorney, Agent, or Firm* — Fox Rothschild LLP; Robert J. Sacco; Carol E. Thorstad-Forsyth

(57) ABSTRACT

Systems (100) and methods (1900) for configuring a computer network ("CN"). The methods comprise: receiving Access Control Information ("ACI") input to a first network node (101-103, 105-107) by a user assigned to a mission; verifying that the user has a right to have access to the CN (100) based on the ACI; granting the user access to CN in response to the verifying; and obtaining Mission Related Information ("MRI") by the first network node. The MRI is associated with the user and at least identifies a first mission plan (120) specifying a manner in which an assigned value for at least one first identity parameter is to be dynamically modified by at least one node (105-107, 113, 114) of CN. Thereafter, the first network node or a second network node (105-107, 113, 114) of CN is configured to operate in accordance with the first mission plan.

20 Claims, 21 Drawing Sheets

(51) Int. Cl.
*H04L 9/08* (2006.01)
*H04L 12/24* (2006.01)

(52) U.S. Cl.
CPC ............ *H04L 63/10* (2013.01); *H04L 63/108* (2013.01); *H04L 63/20* (2013.01); *H04L 41/12* (2013.01); *H04L 41/22* (2013.01)

(56) References Cited

U.S. PATENT DOCUMENTS

| | | | |
|---|---|---|---|
| 6,052,064 A | 4/2000 | Budnik et al. | |
| 6,055,236 A | 4/2000 | Nessett et al. | |
| 6,122,572 A | 9/2000 | Yavnai | |
| 6,154,839 A | 11/2000 | Arrow et al. | |
| 6,510,154 B1 | 1/2003 | Mayes et al. | |
| 6,535,511 B1 | 3/2003 | Rao | |
| 6,618,761 B2 | 9/2003 | Munger et al. | |
| 6,646,989 B1 | 11/2003 | Khotimsky et al. | |
| 6,826,684 B1 | 11/2004 | Fink et al. | |
| 6,917,974 B1 | 7/2005 | Stytz et al. | |
| 6,981,146 B1 | 12/2005 | Sheymov | |
| 7,010,604 B1 | 3/2006 | Munger et al. | |
| 7,043,633 B1 | 5/2006 | Fink et al. | |
| 7,085,267 B2 | 8/2006 | Carey et al. | |
| 7,089,303 B2 | 8/2006 | Sheymov et al. | |
| 7,116,937 B2 | 10/2006 | Kinzler | |
| 7,133,930 B2 | 11/2006 | Munger et al. | |
| 7,216,359 B2 | 5/2007 | Katz et al. | |
| 7,236,598 B2 | 6/2007 | Sheymov et al. | |
| 7,382,778 B2 | 6/2008 | Chari et al. | |
| 7,469,279 B1 | 12/2008 | Stamler et al. | |
| 7,712,130 B2 | 5/2010 | Reamer | |
| 7,739,497 B1 * | 6/2010 | Fink | H04L 29/12433 713/153 |
| 7,756,140 B2 | 7/2010 | Matoba | |
| 7,757,272 B1 | 7/2010 | Dean | |
| 7,787,476 B2 | 8/2010 | Shimizu et al. | |
| 7,895,348 B2 | 2/2011 | Twitchell, Jr. | |
| 7,937,489 B2 * | 5/2011 | Shizuno | H04L 47/2441 709/232 |
| 7,958,556 B2 | 6/2011 | Roesch et al. | |
| 7,996,894 B1 | 8/2011 | Chen et al. | |
| 8,037,530 B1 | 10/2011 | Fink et al. | |
| 8,139,504 B2 | 3/2012 | Mankins et al. | |
| 8,199,677 B1 | 6/2012 | Amis et al. | |
| 8,429,393 B1 * | 4/2013 | Anderson | G06F 21/73 380/273 |
| 8,464,334 B1 | 6/2013 | Singhal | |
| 8,522,341 B2 * | 8/2013 | Nochta | G06F 9/5044 726/20 |
| 8,572,717 B2 | 10/2013 | Narayanaswamy | |
| 8,769,688 B2 | 7/2014 | Geigel | |
| 8,844,036 B2 | 9/2014 | Saidi et al. | |
| 8,862,747 B2 | 10/2014 | Shah et al. | |
| 8,959,573 B2 * | 2/2015 | Smith | H04L 61/2539 726/1 |
| 2002/0010799 A1 * | 1/2002 | Kubota | H04L 29/12009 709/249 |
| 2002/0161884 A1 | 10/2002 | Munger et al. | |
| 2002/0161905 A1 | 10/2002 | Haverinen et al. | |
| 2003/0149783 A1 | 8/2003 | McDaniel | |
| 2004/0012531 A1 | 1/2004 | Toda | |
| 2004/0022194 A1 | 2/2004 | Ricciulli | |
| 2004/0103205 A1 | 5/2004 | Larson et al. | |
| 2004/0255167 A1 | 12/2004 | Knight | |
| 2005/0038708 A1 | 2/2005 | Wu | |
| 2005/0172155 A1 * | 8/2005 | Sheymov | G06Q 20/10 726/5 |
| 2005/0235044 A1 | 10/2005 | Tazuma | |
| 2006/0121418 A1 | 6/2006 | DeMarco et al. | |
| 2006/0230126 A1 | 10/2006 | Bhogal et al. | |
| 2007/0058540 A1 | 3/2007 | Kay | |
| 2007/0073838 A1 | 3/2007 | Shizuno | |
| 2007/0081541 A1 | 4/2007 | Umekage et al. | |
| 2007/0133576 A1 | 6/2007 | Tsuge et al. | |
| 2007/0261112 A1 | 11/2007 | Todd et al. | |
| 2008/0052487 A1 | 2/2008 | Akahane et al. | |
| 2008/0056487 A1 | 3/2008 | Akyol et al. | |
| 2008/0140847 A1 | 6/2008 | Almog | |
| 2008/0159128 A1 | 7/2008 | Shaffer et al. | |
| 2008/0172739 A1 | 7/2008 | Nakae et al. | |
| 2008/0205399 A1 | 8/2008 | Delesalle et al. | |
| 2008/0222734 A1 | 9/2008 | Redlich et al. | |
| 2008/0235755 A1 * | 9/2008 | Blaisdell | H04L 63/0227 726/1 |
| 2008/0313348 A1 | 12/2008 | Morris et al. | |
| 2009/0031042 A1 | 1/2009 | Phatak | |
| 2009/0059788 A1 | 3/2009 | Granovsky et al. | |
| 2009/0103726 A1 | 4/2009 | Ahmed | |
| 2009/0106439 A1 | 4/2009 | Twitchell, Jr. | |
| 2009/0165116 A1 | 6/2009 | Morris | |
| 2009/0265299 A1 | 10/2009 | Hadad et al. | |
| 2009/0285101 A1 | 11/2009 | Lu | |
| 2010/0009758 A1 | 1/2010 | Twitchell, Jr. | |
| 2010/0229241 A1 | 9/2010 | Liu et al. | |
| 2010/0246823 A1 | 9/2010 | Xiao et al. | |
| 2010/0274923 A1 * | 10/2010 | Dean | H04L 29/12396 709/238 |
| 2010/0322391 A1 | 12/2010 | Michaelis et al. | |
| 2010/0333188 A1 * | 12/2010 | Politowicz | H04L 63/1441 726/13 |
| 2011/0016210 A1 | 1/2011 | Underwood | |
| 2011/0103394 A1 * | 5/2011 | Vogt | H04L 29/12367 370/401 |
| 2011/0179136 A1 | 7/2011 | Twitchell, Jr. | |
| 2011/0277032 A1 * | 11/2011 | Vargas | H04L 63/0428 726/23 |
| 2012/0117376 A1 | 5/2012 | Fink et al. | |
| 2012/0201138 A1 | 8/2012 | Yu et al. | |
| 2012/0303616 A1 | 11/2012 | Abuelsaad et al. | |
| 2013/0104228 A1 | 4/2013 | Burnham et al. | |
| 2013/0173361 A1 * | 7/2013 | Son | G06Q 30/0207 705/14.1 |
| 2013/0298221 A1 | 11/2013 | Smith et al. | |
| 2013/0298227 A1 | 11/2013 | Smith et al. | |
| 2013/0298236 A1 | 11/2013 | Smith et al. | |
| 2014/0153924 A1 * | 6/2014 | deRuijter | H04B 10/0773 398/58 |

FOREIGN PATENT DOCUMENTS

| | | |
|---|---|---|
| WO | 1997/013340 | 4/1997 |
| WO | 2014/008125 | 1/2014 |

OTHER PUBLICATIONS

Repik, K.A. "Defeating Adversary Network Intelligence Efforts With Active Cyber Defense Techniques", Degree of Master of Cyber Warfare, Jun. 1, 2008 (Jun. 1, 2008), XP55004366, Retrieved from the Internet: URL:<http://www.dtic.mil/cgi-bin/GetTRDoc?A> D=ADA488411&Location=U2&doc=GetTRDoc.pdf [retrieved on Aug. 9, 2011].

International Search Report dated Mar. 3, 2014, Application Serial No. PCT/SUS2013/038557 in the name of Harris Corporation.

Boukerche et al., "Secure time synchronization protocols for wireless sensor networks," Wireless Communications, IEEE, 2007, vol. 14.5, pp. 64-69.

Wu et al., "CAR: Securing PCM Main Memory System with Cache Address Rernapping," Parallel and Distributed Systems (ICPADS), 2012 IEEE 18th International Conference, Dec. 2012, pp. 628-635.

U.S. Appl. No. 13/369,424, filed Feb. 9, 2012, Dynamic Computer Network With Variable Identity Parameters.

U.S. Appl. No. 13/369,433, filed Feb. 9, 2012, Mission Management for Dynamic Computer Networks.

U.S. Appl. No. 13/369,442, filed Feb. 9, 2012, Bridge for Communicating With a Dynamic Computer Network.

U.S. Appl. No. 13/461,158, filed May 1, 2012, Firewalls for Filtering Communications in a Dynamic Computer Network.

U.S. Appl. No. 13/461,139, filed May 1, 2012, Router for Communicating Data in a Dynamic Computer Network.

(56) References Cited

OTHER PUBLICATIONS

U.S. Appl. No. 13/461,112, filed May 1, 2012, Systems and Methods for Spontaneously Configuring a Computer Network.
U.S. Appl. No. 13/461,099, filed May 1, 2012, Systems and Methods for Implementing Moving Target Technology in Legacy Hardware.
U.S. Appl. No. 13/461,069, filed May 1, 2012, Systems and Methods for Identifying, Deterring and/or Delaying Attacks to a Network Using Shadow Networking Techniques.
U.S. Appl. No. 13/461,057, filed May 1, 2012, Noise, Encryption, and Decoys for Communications in a Dynamic Computer Network.
U.S. Appl. No. 13/461,024, filed May 1, 2012, Systems and Methods for Dynamically Changing Network States.
U.S. Appl. No. 13/461,022, filed May 1, 2012, Switch for Communicating Data in a Dynamic Computer Network.
U.S. Appl. No. 14/072,361, filed Nov. 5, 2013, Systems and Methods for Enterprise Mission Management of a Computer Network.
U.S. Appl. No. 14/083,032, filed Nov. 18, 2013, Session Hopping.
U.S. Appl. No. 13/461,042, filed May 1, 2012, Systems and Methods for Dynamically Changing Network States.
Masking Networks, Inc. "MS-200 Network Masking Capabilities", Jun. 2010.
Jian, Y. et al., "A Novel Scheme for Protecting Receiver's Location Privacy in Wireless Sensor Networks," IEEE Transactions on Wireless Communications, vol. 7, No. 10, Oct. 2008, pp. 3769-3779.
International Preliminary Report on the Patentability dated Nov. 13, 2014, Application Serial No. PCT/US2013/037883 in the name of Harris Corporation.
International Preliminary Report on the Patentability dated Nov. 13, 2014 Application Serial No. PCT/US2013/037888 in the name of Harris Corporation.
International Preliminary Report on the Patentability dated Nov. 13, 2014 Application Serial No. PCT/US2013/037894 in the name of Harris Corporation.
International Preliminary Report on the Patentability dated Nov. 13, 2014 Application Serial No. PCT/US2013/037976 in the name of Harris Corporation.
International Preliminary Report on the Patentability dated Nov. 13, 2014 Application Serial No. PCT/US2013/038557 in the name of Harris Corporation.
International Preliminary Report on the Patentability dated Nov. 13, 2014 Application Serial No. PCT/US2013/038558 in the name of Harris Corporation.
International Preliminary Report on the Patentability dated Nov. 13, 2014 Application Serial No. PCT/US2013/038600 in the name of Harris Corporation.
Ganeriwal et al., Secure time synchronization service for sensor networks, 2010, ACM Digital Library, pp. 97-106.
Rajasegarar et al., Anomaly detection in wireless sensor networks, 2008, IEEE, vol. 15, Issue 4, pp. 34-40.
Search Report for Taiwan Patent Application No. 102115550 dated Oct. 20, 2014.
Shi, L., et al., "Full Service Hopping for Proactive Cyber-Defense", International Conference on Networking, Sensing and Control, 2008. ICNSC 2008, IEEE, Apr. 6-8, 2008.
Kewley, D., et al., "Dynamic Approach to Thwart Adversary Intelligence Gathering," pp. 176-185, 0-7695-1212-7/01 2001 IEEE.
Beraud, P., et al., "Cyber Defense Network Maneuver Commander", 978-1-4244-7402-8/10 2010 IEEE.
Levin, D., "Lessons Learned in Using Live Red Teams in IA Experiments", Retrieved from the Internet <URL:http://www.bbn.com/resources/pdf/RedTeamExptsPaper-Levin10-02.pdf», [retrieved on Apr. 9, 2012].
Information about Related Patents and Patent Applications, see section 6 of the accompanying Information Disclosure Statement Letter, which concerns Related Patents and Patent Applications.
Michalski, John., et al., "Final Report for the Network Security Mechanisms Utilizing Network Address Translation LDRD Project (SAND2002-3613)" (Nov. 2002) Retrieved from the Internet: URL:http://prod.sandia.gov/techlib/access-control.cgi/2002/023613.pdf [retrieved on Apr. 19, 2013].
International Search Report dated Apr. 29, 2013, Application Serial No. PCT/US2013/023702 in the name of Harris Corporation.
Atighetchi, M., et al, "Adaptive Use of Network-Centric Mechanism in Cyber-Defense", Proc. 6th IEEE International Symp. Object-Oriented Real-Time Distributed Computing, IEEE CS Press, 2003, p. 183-192.

\* cited by examiner

| Identity Parameter | Description | Technique |
|---|---|---|
| IP Address | 32 bit number, Class C 254 Addresses | IP Header Manipulation Packet Data Manipulation |
| MAC Address | 6 Bytes - 281,474,976,710,656 Addresses First 3 Bytes - (OUI), Last 3 Bytes -- NIC Specific | Ethernet Header Manipulation |
| Net/Subnet | Class A, B, or C Addresses | Cross Stream Fragmentation |
| TCP Sequence # | Make TCP Sequence numbers random. | TCP Header Manipulation |
| Port | 1 - 65,535 (ex. 2957) | TCP Header Manipulation |

FIG. 18

SYSTEMS AND METHODS FOR DEPLOYMENT OF MISSION PLANS USING ACCESS CONTROL TECHNOLOGIES

BACKGROUND OF THE INVENTION

Statement of the Technical Field

The inventive arrangements relate to computer network security, and more particularly to systems for using various types of access control technology to provide a computer network which is dynamically maneuverable to defend against malicious attacks.

Description of the Related Art

The central weakness of current cyber infrastructure is its static nature. Assets receive permanent or infrequently-changing identifications, allowing adversaries nearly unlimited time to probe networks, map and exploit vulnerabilities. Additionally, data traveling between these fixed entities can be captured and attributed. The current approach to cyber security places technologies such as firewalls and intrusion detection systems around fixed assets, and uses encryption to protect data en route. However, this traditional approach is fundamentally flawed because it provides a fixed target for attackers. In today's globally connected communications infrastructure, static networks are vulnerable networks.

The Defense Advanced Research Projects Agency ("DARPA") Information Assurance ("IA") Program has performed initial research in the area of dynamic network defense. A technique was developed under the IA program to dynamically reassign Internet protocol ("IP") address space feeding into a pre-designated network enclave for the purpose of confusing any would-be adversaries observing the network. This technique is called DYnamic Network Address Transformation ("DYNAT"). An overview of the DYNAT technology was presented in a paper by DARPA entitled "Dynamic Approaches to Thwart Adversary Intelligence" which was published in 2001.

SUMMARY OF THE INVENTION

Embodiments of the present invention concern systems and methods for configuring a computer network. The methods comprise receiving first access control information at a first network node of the computer network. The first access control information is input to the first network node by a first user assigned to a first mission (e.g., via a user-software interaction or via a swipe of a smart card). Subsequently, operations are performed to verify that the first user has a right to have access to the computer network based on the first access control information. In response to this verification, the first user is granted access to the computer network. Thereafter, first mission related information is obtained by the first network node (e.g., from a smart card). The first mission related information is associated with the first user and at least identifies a first mission plan. The first mission plan specifies a manner in which an assigned value for at least one first IDentity Parameter ("IDP") is to be dynamically modified by at least one node of the computer network. Next, the first network node or a second network node of the computer network is configured to operate in accordance with the first mission plan.

In some scenarios, the first network node is a client computer operable to configure the second network node to operate in accordance with the first mission plan. Alternatively, the first network node is a network device communicatively coupled to at least one client computer and configurable to operate in accordance with the first mission plan.

In scenarios where the first mission related information is obtained from a smart card, the first mission related information comprises an identifier of a mission for which the first mission plan was generated ("the mission identifier"), an identifier of the first mission plan ("first mission plan identifier"), an identifier of the first user ("first user identifier"), the first mission plan, and/or a cryptographic key for decrypting the first mission plan. If the first mission related information does not include the first mission plan, then the first mission plan or at least configuration data of the first mission plan is retrieved from a data store based on the mission identifier, the first mission plan identifier, and/or the first user identifier. The data store is local to or remote from the first or second network node(s). The first mission plan may have been stored on the smart card or in the data store in an encrypted form. In this regard, the first mission plan can be decrypted prior to when the computer network is configured to operate in accordance therewith.

In some scenarios, the first user may be simultaneously or sequentially assigned to the two or more missions, such as the first mission and a second different mission. Therefore, the mission related information stored on the smart card may be updated accordingly. In this regard, the methods may further comprise: storing the first mission related information on the smart card when the first user is assigned to the first mission; and storing second mission related information on the smart card when the first user is assigned to the second different mission. The second mission related information at least identifies a second mission plan specifying a manner in which an assigned value for at least one second IDP is to be dynamically modified by at least one node of the computer network.

Also, two or more users may use the same client computer during different time periods. In this scenario, the proper mission plan is activated at the start of each time period (or as required) based on information received from the respective user and/or smart card during or after an access control process. In this regard, the methods may further comprise terminating the first user's access to the computer network; receiving second access control information input to the first network node by a second user assigned to a second mission; verifying that the second user has a right to have access to the computer network based on the second access control information; and granting the second user access to the computer network in response to the verifying. Thereafter, second mission related information is obtained by the first network node. The second mission related information associated with the second user and at least identifying a second mission plan specifying a manner in which an assigned value for at least one second identity parameter is to be dynamically modified by at least one node of the computer network. The first network node or the second network node is then configured to operate in accordance with the second mission plan.

BRIEF DESCRIPTION OF THE DRAWINGS

Embodiments will be described with reference to the following drawing figures, in which like numerals represent like items throughout the figures, and in which:

FIG. 18 is a table that is useful for understanding some of the types of IDPs that can be modified.

DETAILED DESCRIPTION

Figure 1:
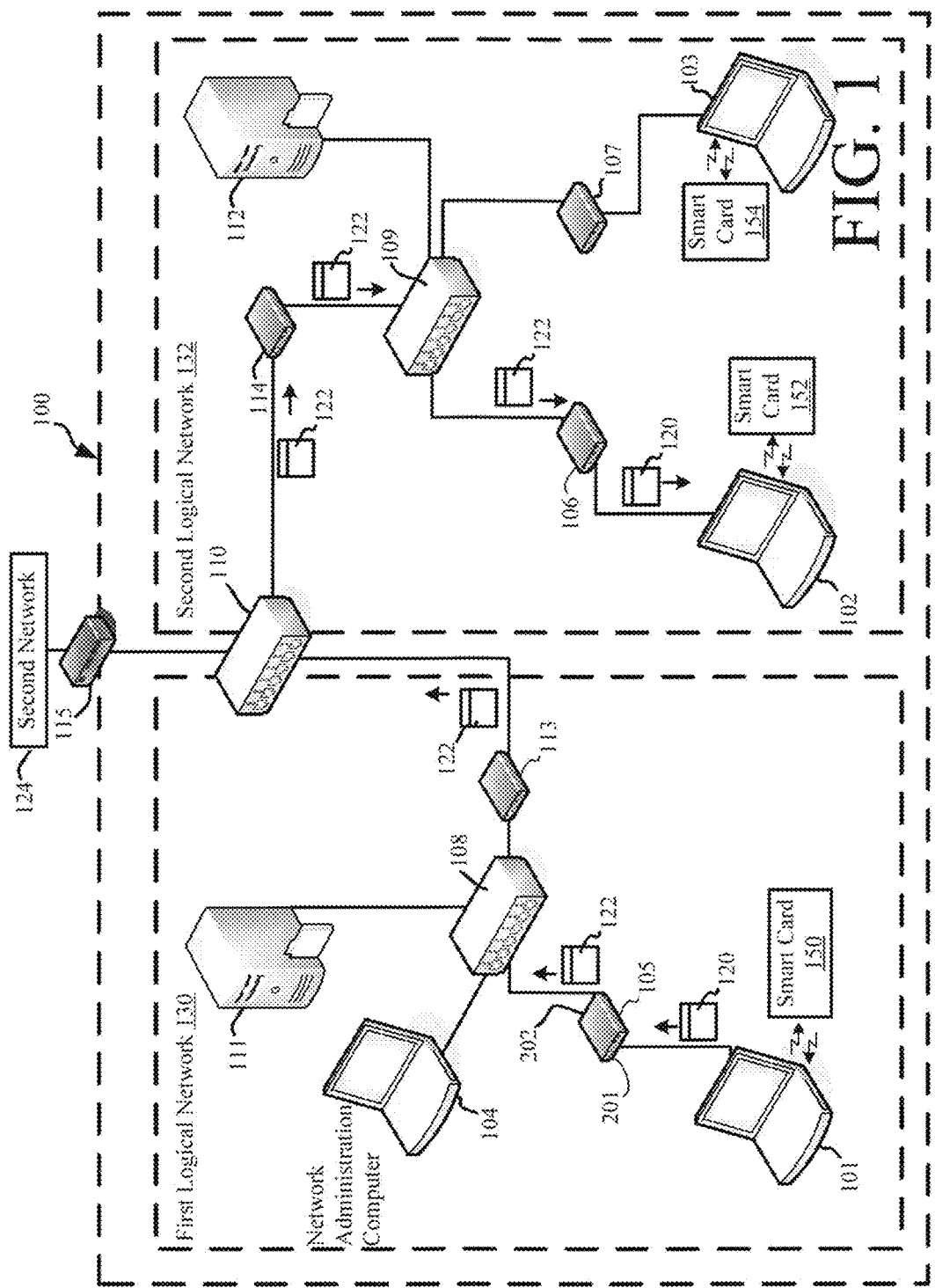
FIG. 1 is an example of a computer network that is useful for understanding the present invention.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

It should also be appreciated that the terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Further, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Overview of the Present Invention

The present invention generally concerns systems and method for providing a computer network which is dynamically maneuverable to defend against malicious attacks. Such a computer network is provided using various types of access control techniques to at least partially configure the maneuverability behavior of the computer network, as will be described in detail below. The access control techniques can include, but are not limited to, user log in techniques in which a user inputs access control information (e.g., user authentication information such as a user name, a password and/or biometric information) to obtain access to resources of the computer network, and/or a smart card technique in which a user swipes a smart card to input the access control information so as to obtain access to the resources of the computer network.

Smart cards are well known in the art, and therefore will not be described in detail herein. However, it should be understood that smart cards generally comprise a pocket sized card with integrated circuitry (including a memory and a communication means). A smart card provides a means for giving a user with a single sign on authority so that the system can reliably determine if the user has the right and the authority to have access to the computer network.

As noted above, various access control techniques are used to at least partially configure the maneuverability behavior of the computer network. In some scenarios, the maneuverability behavior of the computer network is defined by an electronic mission plan (e.g., a mission plan in a machine readable form). For example, an electronic mission plan may indicate that a particular module of the computer network is to selectively modify at least one IDP of packets (e.g., a source identifier) being communicated over the computer network. As such, the electronic mission plan must be distributed to the particular module so that it can operate in the manner defined thereby.

The electronic mission plan can be distributed to the module in a plurality of ways. For example, the mission plan can be: (a) downloaded from a remote data store of the computer network; and/or (b) downloaded from a smart card (e.g., after a user's identity has been authenticated and/or the user's access rights have been verified based on information obtained from the user and/or smart card). In both scenarios (a) and (b), the mission plan can be downloaded to the module in an encrypted or decrypted form. In the encrypted scenarios, a cryptographic key and/or algorithm can be obtained from a remote data store, a local data store, and/or a data store of the smart card. In the decrypted scenarios, the mission plan may be decrypted by a remote computer, a client computer and/or the smart card prior to being downloaded to the module.

Once the mission plan has been downloaded to the module and/or decrypted, it can be activated such that the module operates according to the maneuverability behavior defined therein. The mission plan can be activated automatically in response to the reception thereof at the module. Additionally and/or alternatively, the mission plan can be activated in response to: a command received from a remote computer being controlled by a network administrator; a command received from control software of the computer network; a command received from a client computer being used by a user assigned to the mission for which the mission plan was generated; receipt of information from the smart card (e.g., a mission identifier, a mission plan identifier, and/or a user identifier); and/or expiration of a pre-defined time period.

Figure 19:
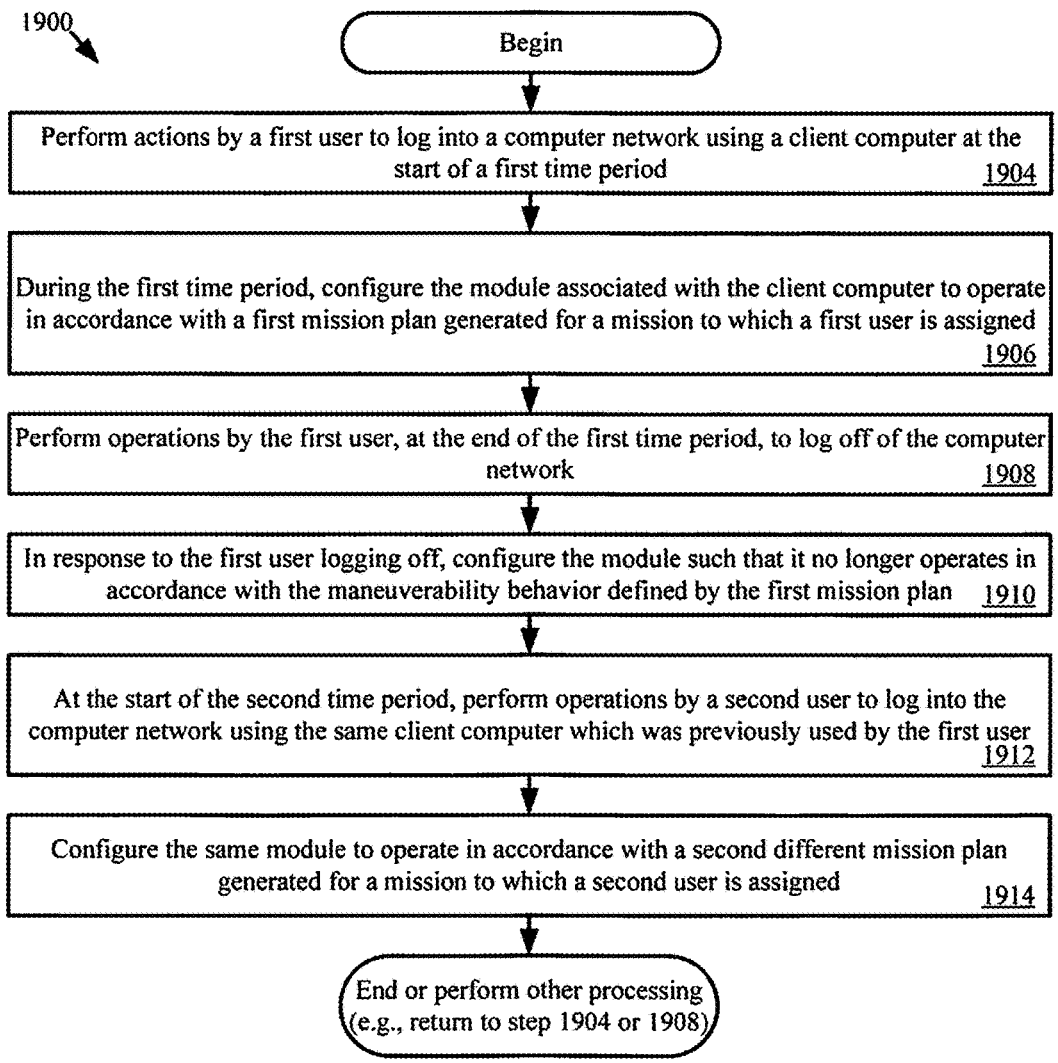
FIG. 19 is a flow diagram of an exemplary process when two user, who are assigned to different missions, sequentially log into the same client computer.

Notably, two or more users may use the same client computer during different time periods. In this scenario, the proper mission plan is activated at the start of each time period based on information received from the user and/or smart card during or after an access control process. This concept is illustrated in FIG. 19. For example, a first user logs into the computer network using a client computer at the start of a first time period (as shown by step 1904). During the first time period, the module associated with the client computer is configured to operate in accordance with a first mission plan generated for a mission to which a first user is assigned (as shown by step 1906). At the end of the first time period, the first user logs off of the computer network (as shown by step 1908). In response to the first user logging off, the module is configured such that it no longer operates in accordance with the maneuverability behavior defined by the first mission plan (as shown by 1910). Although this specific module no longer operates in accordance with the first mission plan, other modules may continue to operate in accordance with the first mission plan since the first mission plan may still be active within the computer system. At the start of the second time period, a second user logs into the computer network using the same client computer which was previously used by the first user (as shown by 1912). Next, the same module is configured to operate in accordance with a second different mission plan generated for a mission to which a second user is assigned (as shown by 1914). In this scenario, the enterprise mission management of the computer network is tied to the access control techniques (and more specifically the users and smart cards) being employed thereby. Such an enterprise mission management technique provides users with real time access to mission plans, regardless of the actual client computer which is currently being used thereby.

Figure 20:
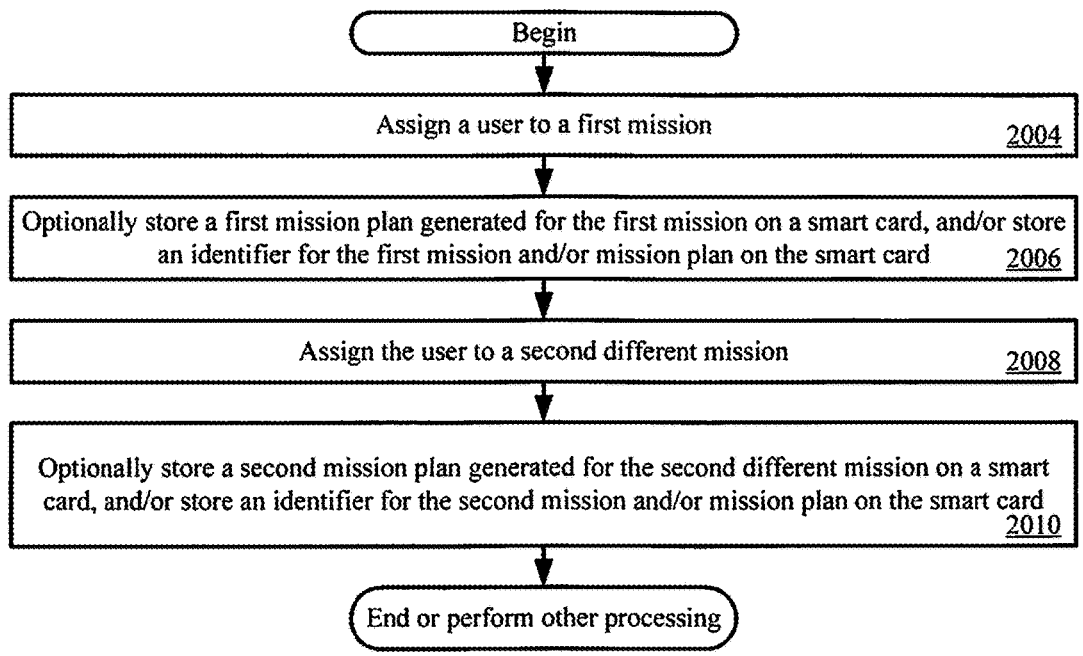
FIG. 20 is a flow diagram of an exemplary process when a user is simultaneously or sequentially assigned to two different missions.

In some scenarios, a single user may be simultaneously or sequentially assigned to two different missions. Therefore, the information stored on the smart card may be updated accordingly. For example, the information stored on the smart card can be updated (a) when a mission plan is to be downloaded therefrom to a module or (b) when the mission plan is to be loaded on the module based on information received from the smart card. This concept is illustrated in FIG. 20. For example, a user is assigned to a first mission (as shown by step 2004). Thereafter, mission plan related information is optionally stored on a smart card (as shown by step 2006). The mission plan related information can include, but is not limited to, a first mission plan which was generated for the first mission, and/or an identifier for the first mission or mission plan. The user is then assigned to a second different mission (as shown by step 2008). Subsequently, the mission plan related information of the smart card is optionally updated to include a second mission plan which was generated for the second different mission, and/or an identifier for the second mission and/or mission plan (as shown by step 2010). This updating may be employed to ensure that the correct mission plan(s) is(are) enabled when the user logs into the computer network using a smart card.

In other scenarios, the mission plans are pre-stored in a module(s) so as to be associated with an identifier of the user to which the user has been assigned. As such, when a user logs into the computer network, the correct mission plan(s) is(are) automatically activated based on a user identifier received from the user via a user-software interaction with a client computer and/or a swipe of a smart card. Accordingly, the information stored on the smart card does not need to be updated each time the user is assigned to a new mission.

Identity Agile Computer Network

Referring now to FIG. 1, there is shown a diagram of an exemplary computer network 100 which includes a plurality of computing devices. The computing devices can include client computers 101-103, NAC 104, servers 111, 112, network layer 2 switches 108, 109, a layer 3 switch 110, and a bridge 115. The client computers 101-103 can be any type of computing device which might require network services, such as a conventional tablet, a notebook, a laptop or a desktop computer. The layer 3 switch 110 can be a conventional routing device that routes data packets between computer networks. The layer 2 switches 108, 109 are hub devices (e.g., an Ethernet hub) as are well known in the art. Servers 111, 112 can provide various computing services utilized by client computers 101-103. For example, the servers 111, 112 can be file servers which provide a location for shared storage of computer files used by client computers 101-103.

The communication media for the computer network 100 can be wired, wireless or both, but shall be described herein as a wired network for simplicity and to avoid obscuring the invention. The network will communicate data using a communication protocol. As is well known in the art, the communication protocol defines the formats and rules used for communicating data throughout the network. The computer network 100 in FIG. 1 can use any communication protocol or combination of protocols which is now known or known in the future. For example, the computer network 100 can use the well known Ethernet protocol suite for such communications. Alternatively, the computer network 100 can make use of other protocols, such as the protocols of an internet protocol suite (often referred to as the Transmission Control Protocol/Internet Protocol ("TCP/IP") suite), Synchronous Optical NETwork/Synchronous Digital Hierarchy ("SONET/SDH") based protocols, or Asynchronous Transfer Mode ("ATM") communication protocols. In some embodiments, one or more of these communication protocols can be used in combination. Although one network topology is shown in FIG. 1, the invention is not limited in this regard. Instead, any type of suitable network topology can be used, such as a bus network, a star network, a ring network or a mesh network.

The invention generally concerns a method for communicating data in a computer network (e.g., in computer network 100), where data is communicated from a first computing device to a second computing device. Computing devices within the network are represented with multiple IDPs. The phrase "identity parameters or IDPs", as used herein, can include items such as an IP address, a Media Access Control ("MAC") address, a port number and so on. However, the invention is not limited in this regard, and the IDPs can also include a variety of other information which is useful for characterizing a network node. The various types of IDPs contemplated herein are discussed below in further detail. In some scenarios, the IDPs include those parameters contained in a header and/or trailer portion of a data packet, and not those contained in a payload portion of the data packet. Still, embodiments are not limited to the particularities of these scenarios.

The inventive arrangements involve the use of Moving Target Technology ("MTT") to manipulate one or more of such IDPs for one or more computing devices within the computer network 100. This technique disguises communication patterns and network addresses of such computing devices. The manipulation of IDPs as described herein is generally performed in conjunction with data communications in the computer network 100, i.e., when data is to be communicated from a first computer in the network (e.g., client computer 101) to a second computer in the network (e.g., client computer 102). Accordingly, the IDPs that are manipulated can include those of a source computing device (i.e., the device from which the data originated) and the destination computing device (i.e., the device to which the data is being sent). The set of IDPs that is communicated is referred to herein as an IDP set. This concept is illustrated in FIG. 1, which shows that an IDP set 120 is transmitted by client computer 101 as part of a data packet (not shown).

The process according to the inventive arrangements involves selectively modifying at a first location within the computer network 100, values contained in a data packet or datagram which specify one or more IDPs of a source computing device and/or a destination computing device. The IDPs are modified in accordance with a mission plan. The location where such modification is performed will generally coincide with the location of one module 105-107, 113, 114 of the computer network 100. Referring once again to FIG. 1, it can be observed that the modules 105-107, 113, 114 are interposed in the computer network 100 between the various computing devices which comprise nodes in such network. In these locations, the modules 105-107, 113, 114 intercept data packet communications, perform the necessary manipulations of IDPs, and retransmit the data packets along a transmission path. In alternative embodiments, the modules 105-107, 113, 114 can perform a similar function, but can be integrated directly into one or more of the computing devices. For example, the modules could be integrated into client computers 101, 102, 103, servers 111, 112, layer 2 switches 108, 109, and/or layer 3 switch 110.

Additionally, the computer network 100 can be divided into a number of logical subdivisions, sometimes referred to as sub-networks or subnets, connected through layer 3 switch 110. An enterprise network can be divided into a number of subnets for a variety of administrative or technical reasons including, but not limited to, hiding the topology of the network from being visible to external hosts, connecting networks utilizing different network protocols, separately administering network addressing schemes on the subnet level, enabling management of data traffic across subnets due to constrained data connections, and the like. Subnetting is well known in the art and will not be described in further detail.

Referring again to FIG. 1, the computer network 100 is divided into two logical networks, namely a first logical network 130 and a second logical network 132. The phrase "logical network", as used herein, refers to any logical subdivision of a computer network. In an embodiment, logical networks 130, 132 are connected through layer 3 switch 110. Layer 3 switch 110 is responsible for directing traffic between the logical networks, i.e., from client computer 101 to client computer 103. Layer 3 switch 110 is also responsible for directing traffic from any host connected to the computer network 100 bound for a second network 124. In the embodiment shown in FIG. 1, traffic routed from the computer network 100 to the second network 124 passes through bridge 115. As with the modules above, the functionality of the bridge 115 could be integrated within layer 3 switch 110.

Figure 2:
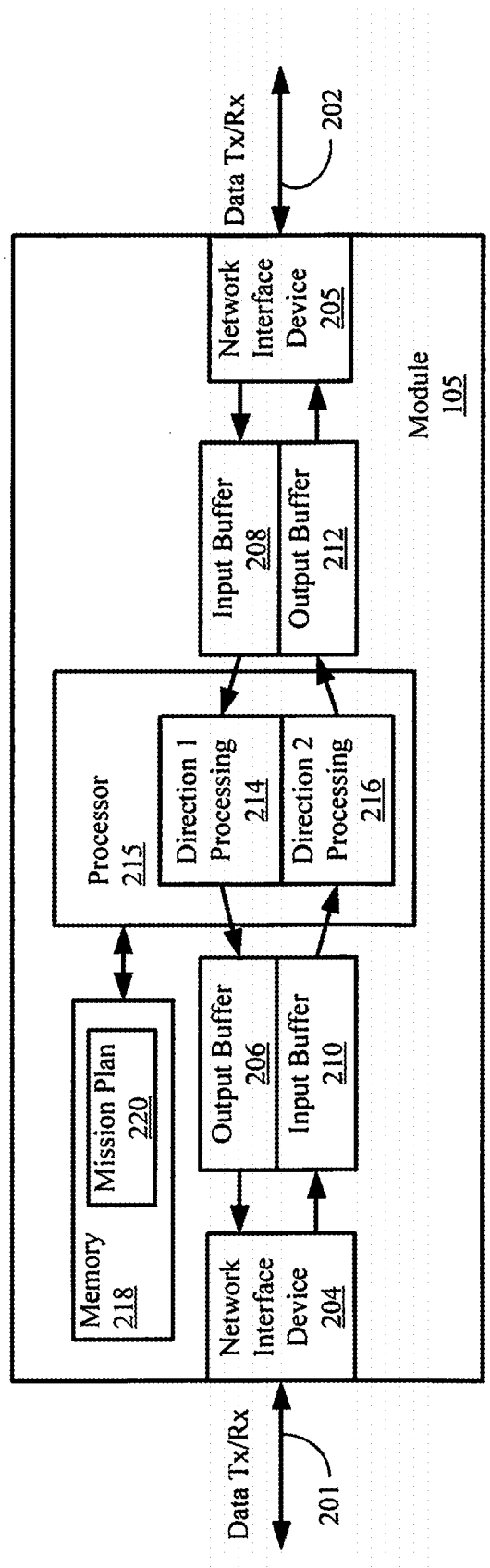
FIG. 2 is an example of a module that can be used in the present invention for performing certain manipulations of IDPs.

An example of a functional block diagram of a module 105 is shown in FIG. 2. Modules 106, 107, 113, 114 of FIG. 1 can have a similar functional block diagram as that shown in FIG. 2, but it should be understood that the invention is not limited in this regard. As shown in FIG. 2, the module 105 has at least two data ports 201, 202, each of which can correspond to a respective network interface device 204, 205. Data received at data port 201 is processed at network interface device 204 and temporarily stored at an input buffer 210. The processor 215 accesses the input data packets contained in input buffer 210 and perform any necessary manipulation of IDPs as described herein. The modified data packets are passed to output buffer 212 and subsequently transmitted from data port 202 using network interface device 205. Similarly, data received at data port 202 is processed at network interface device 205 and temporarily stored at an input buffer 208. The processor 215 accesses the input data packets contained in input buffer 208 and performs any necessary manipulation of IDPs as described herein. The modified data packets are passed to an output buffer 206 and subsequently transmitted from data port 201 using network interface device 204. In module 105, manipulation of IDPs is performed by processor 215 in accordance with a mission plan 220 stored in a memory 218.

It will be understood from FIG. 2 that the module 105 is preferably configured so that it operates bi-directionally. In such embodiments, the module 105 can implement different modification functions, depending on a source of a particular data packet. The dynamic modification function in the module 105 can be specified in the mission plan in accordance with a source computing device of a particular data packet. The module 105 can determine a source of data packets by any suitable means. For example, a source address of a data packet can be used for this purpose.

During operation, the processor 215 will determine one or more false IDP values that are to be used in place of the true IDP values. The processor 215 will transform one or more true IDP values to one or more false IDP values which are in some scenarios specified by a pseudorandom or chaotic function. Following this transformation, the module 105 will forward the modified packet or datagram to the next node of the computer network 100 along a transmission path. At subsequent points in the communication path, an adversary who is monitoring such network communications will observe false or incorrect information about the identity of computing devices communicating on the computer network 100.

IDP values will have a predetermined format that is defined by a communication protocol. For example, an IP address and a MAC address will each have a known predetermined format. Since it is a desirable that an attacker be unable to discern true IDPs from false IDPs, the false IDP values should have the same format as the true IDPs. In other words, a false IDP should have all of the correct characteristics and formatting which are normally specified for that type of IDP when using a particular network communication protocol. For purposes of the present invention, it is anticipated that IDPs may be transmitted in the clear (i.e., the information will not be encrypted). By maintaining the correct format for both true and false IDPs included in transmitted data packets, the system ensures that an adversary observing network traffic cannot effectively determine whether transmitted IDP values are actually true or false.

In some scenarios, the false IDPs that are specified by the pseudorandom or chaotic function are varied in accordance with the occurrence of one or more reactive trigger events. A reactive trigger event causes the processor 215 to use the pseudorandom or chaotic function to generate a new set of false IDP values into which the true IDPs are transformed. Accordingly, the reactive trigger event serves as a basis for the dynamic variation of the false IDPs described herein. Reactive trigger events are discussed in more detail below. However, it should be noted that reactive trigger events for selecting a new set of false values for IDPs can be based on at least one pre-defined rule. The rule comprises a statement that defines at least one reactive trigger event. In this regard, the user rule may implement a packet inspection based scheme, a congestion level based scheme, a heuristic algorithm based scheme, and/or a Network-Based Attack ("NBA") analysis based scheme. Each of the listed schemes will be described in detail below.

The transformation of IDPs described above provides one way to maneuver a computer network 100 for purposes of thwarting a cyber attack. In some scenarios, the mission plan 220 implemented by processor 215 will also control certain other aspects of the manner in which computer network 100 can maneuver. For example, the mission plan 220 can specify that a dynamic selection of IDPs is manipulated. The dynamic selection can include a choice of which IDPs are selected for modification, and/or a number of such IDPs that are selected. This variable selection process provides an added dimension of uncertainty or variation which can be used to further thwart an adversary's effort to infiltrate or learn about a computer network 100. As an example of this technique, consider that during a first time period, the module 105 can modify a destination IP address and a destination MAC address of each data packet. During a second time period, the module 105 could manipulate the source IP address and a source host name in each data packet. During a third period of time, the module 105 could manipulate a source port number and a source user name. Changes in the selection of IDPs can occur synchronously (i.e., all selected IDPs are changed at the same time). Alternatively, changes in the selection of IDPs can occur asynchronously (i.e., the group of selected IDPs changes incrementally as individual IDPs are added or removed from the group of selected IDPs).

A pseudorandom or chaotic function is used in some scenarios for determining the selection of IDP values that are to be manipulated or transformed into false IDP values. In other words, the module 105 will transform only the IDPs selected by the pseudorandom or chaotic function. In some scenarios, the selection of IDPs that are specified by the pseudorandom function is varied in accordance with the occurrence of a reactive trigger event. The reactive trigger event causes processor 215 to use a pseudorandom or chaotic function to generate a new selection of IDPs which are to be transformed into false IDPs. Accordingly, the reactive trigger event serves as a basis for the dynamic variation of the selection of IDPs described herein. Notably, the values of the IDPs can also be varied in accordance with a pseudorandom or chaotic algorithm.

The module 105 is advantageously capable of also providing a third method of maneuvering the computer network for purposes of thwarting a cyber attack. Specifically, the mission plan 220 loaded in module 105 can dynamically vary the location within the network where the modification or transformation of the IDPs takes place. Consider that modification of IDPs in an IDP set 120 sent from client computer 101 to client computer 102 could occur in module 105. This condition is shown in FIG. 1, where the IDPs contained in IDP set 120 are manipulated in module 105 so that the IDP set 120 is transformed to a new or modified IDP set 122. At least some of the IDPs in the IDP set 122 are different as compared to the IDPs in the IDP set 120. But, the location where such transformation occurs is preferably also controlled by the mission plan. Accordingly, manipulation of the IDP set 120 could, for example, sometimes occur at module 113 or 114 of FIG. 1, instead of at module 105. This ability to selectively vary the location where manipulation of IDPs occurs adds a further important dimension to the maneuvering capability of the computer network 100.

The dynamic variation in the location where IDPs are modified is facilitated by selectively controlling an operating state of each module 105-107, 113, 114 of FIG. 1. To that end, the operational states of each module 105-107, 113, 114 of FIG. 1 preferably includes (1) an active state in which data is processed in accordance with a current mission plan, and (2) a bypass state in which packets can flow through the module as if the module was not present. The location where the dynamic modification is performed is controlled by selectively causing certain modules of the computer network 100 to be in an active state and certain modules of the computer network 100 to be in a standby state. The location can be dynamically changed by dynamically varying the current state of the modules 105-107, 113, 114 of FIG. 1 in a coordinated manner.

The mission plan 220 can include a predefined sequence for determining the locations within the computer network 100 where the IDPs are to be manipulated. Locations where IDPs are to be manipulated will change in accordance with the predefined sequence at times indicated by a reactive trigger event. For example, the reactive trigger event can cause a transition to a new location for manipulation or transformation of IDPs as described herein. Accordingly, the reactive trigger event serves as a basis for the occurrence of a change in the location where IDPs are modified, and the predefined sequence determines where the new location will be.

From the foregoing, it will be appreciated that a data packet is modified at a module 105-107, 113, 114 of FIG. 1 to include false IDP values. At some point within the computer network 100, it is necessary to restore the IDP values to their true IDP values, so that the IDPs can be used to properly perform their intended function in accordance with the particular network protocol. Accordingly, the inventive arrangements also includes dynamically modifying, at a second location (i.e., a second module), the assigned values for the IDPs in accordance with the mission plan 220. The modification at the second location essentially comprises an inverse of a process used at the first location to modify the IDPs. The module at the second location can thus restore or transform the false IDP values back to their true IDP values. In order to accomplish this action, the module at the second location must be able to determine at least (1) a selection of IDP values that are to be transformed, and (2) a correct transformation of the selected IDP values from false IDP values to true IDP values. In effect, this process involves an inverse of the pseudorandom or chaotic process or processes used to determine the IDP selection and the changes effected to such IDP values. The inverse transformation step is illustrated in FIG. 1, where the IDP set 122 is received at module 106, and the IDP values in IDP set 122 are transformed or manipulated back to their original or true values. In this scenario, module 106 converts the IDP values back to those of IDP set 120.

Notably, a module must have some way of determining the proper transformation or manipulation to apply to each data communication it receives. In some scenarios, this determination is performed by examining at least a source address IDP contained within the received data communication. For example, the source address IDP can include an IP address of a source computing device. Once the true identity of the source computing device is known, the module consults the mission plan (or information derived from the mission plan) to determine what actions it needs to take. For example, these actions could include converting certain true IDP values to false IDP values. Alternatively, these changes could include converting false IDP values back to true IDP values.

Notably, there will be instances where the source address IDP information contained in a received data communication has been changed to a false value. In those circumstances, the module receiving the data communication will not immediately be able to determine the identity of the source of the data communication. However, the module which received the communication can in such instances still identify the source computing device. This is accomplished at the receiving module by comparing the false source address IDP value to a Look-Up-Table ("LUT") which lists all such false source address IDP values in use during a particular time. The LUT also includes a list of true source address IDP values that correspond to the false source address IDP values. The LUT can be provided directly by the mission plan 220 or can be generated by information contained within the mission plan 220. In either case, the identification of a true source address IDP value can be easily determined from the LUT. Once the true source address IDP has been determined, then the module which received the data communication can use this information to determine (based on the mission plan) what manipulations to the IDPs are needed.

Notably, the mission plan 220 can also specify a variation in the second location where IDP values are restored to their true values. For example, assume that the IDPs are dynamically modified at a first location comprising module 105. The mission plan can specify that the restoration of the IDPs to their true values occurs at module 106 as described, but can alternatively specify that dynamic modification occur instead at module 113 or 114. In some embodiments, the location where such manipulations occur is dynamically determined by the mission plan in accordance with a pre-defined sequence. The predefined sequence can determine the sequence of locations or modules where the manipulation of IDPs will occur.

The transition involving dynamic modification at different locations preferably occurs in accordance with a reactive trigger event. Accordingly, the predefined sequence determines the pattern or sequence of locations where data manipulations will occur, and the reactive trigger event serves as a basis for causing the transition from one location to the next. Reactive trigger events are discussed in more detail below; however, it should be noted that reactive trigger events can be based on at least one pre-defined rule. The rule comprises a statement that defines at least one reactive trigger event. In this regard, the user rule may implement a packet inspection based scheme, a congestion level based scheme, a heuristic algorithm based scheme, and/or an NBA analysis based scheme. Each of the listed schemes will be described below in detail. Control over the choice of a second location (i.e., where IDPs are returned to their true values) can be effected in the same manner as described above with regard to the first location. Specifically, operating states of two or more modules can be toggled between an active state and a bypass state. Manipulation of IDPs will only occur in the module which has an active operating state. The module with a bypass operating state will simply pass data packets without modification.

Alternative methods can also be used for controlling the location where manipulation of IDPs will occur. For example, a network administrator can define in a mission plan several possible modules where IDPs can be converted from true values to false values. Upon the occurrence of a reactive trigger event, a new location can be selected from among the several modules by using a pseudorandom or chaotic function, and using a trigger time as a seed value for the pseudorandom or chaotic function. If each module implements the same pseudorandom or chaotic function using the same initial seed values then each module will calculate the same pseudorandom or chaotic value. The trigger time can be determined based on a clock time, such as a GPS time or system clock time. In this way, each module can independently determine whether it is currently an active location where manipulation of IDPs should occur. Similarly, the network administrator can define in a mission plan several possible modules where dynamic manipulation returns the IDPs to their correct or true values. The selection of which module is used for this purpose can also be determined in accordance with a trigger time and a pseudorandom or chaotic function as described herein. Other methods are also possible for determining the location or module where IDP manipulations are to occur. Accordingly, the invention is not intended to be limited to the particular methods described herein.

Notably, varying the position of the first and/or second locations where identity functions are manipulated will often result in varying a physical distance between the first and second location along a network communication path. The distance between the first and second locations is referred to herein as a distance vector. The distance vector can be an actual physical distance along a communication path between the first and second location. However, it is useful to think of the distance vector as representing the number of network nodes that are present in a communication path between the first and second locations. It will be appreciated that dynamically choosing different positions for the first and second locations within the network can have the effect of changing the number of nodes between the first and second locations. For example, in FIG. 1, the dynamic modification of IDPs is implemented in selected ones of the modules 105, 106, 107, 113, 114. The modules actually used to respectively implement the dynamic modification are determined as previously described. If module 105 is used for converting IDPs to false values and module 106 is used to convert them back to true values, then there are three network nodes (108, 110, 109) between modules 105 and 106. But if module 113 is used to convert true IDP values to false IDP values and module 114 is used to convert the false IDP values back to true IDP values, then there is only one network node 110 between modules 113 and 114. Accordingly, it will be appreciated that dynamically changing the position of locations where dynamic modification occurs can dynamically vary the distance vector. This variation of the distance vector provides an added dimension of variability to network maneuvering or modification as described herein.

In the present invention, the manipulation of IDP values, the selection of IDPs, and the locations where these IDPs is each defined as a maneuvering parameter. Whenever a change occurs in one of these three maneuvering parameters, it can be said that a network maneuver has occurred. Any time one of these three maneuvering parameters is changed, we can say that a network maneuver has occurred. In order to most effectively thwart an adversary's efforts to infiltrate a computer network 100, network maneuvering is controlled by means of a pseudorandom or chaotic process as previously described. Chaotic processes are technically different as compared to pseudorandom processes, but for purposes of the present invention, either can be used, and the two are considered equivalent. In some scenarios, the same pseudorandom or chaotic process can be used for dynamically varying two or more of the maneuvering parameters. However, in other scenarios, two or more different pseudorandom or chaotic processes are used so that two or more of these maneuvering parameters are modified independently of the others.

Reactive Trigger Events

As noted above, the dynamic changes to each of the maneuvering parameters is controlled by at least one reactive trigger. A reactive trigger is a purely spontaneous or user initiated event that causes a change to occur in relation to the dynamic modifications described herein. Stated differently, it can be said that the reactive trigger causes the network to maneuver in a new way that is different than at a previous time (i.e., before the occurrence of the reactive trigger). For example, during a first period of time, a mission plan or security model can cause an IP address to be changed from value A to value B; but after the reactive trigger event, the IP address can instead be changed from value A to value C. Similarly, during a first period of time a mission plan or security model can cause an IP address and a MAC address to be modified; but after the reactive trigger event, the mission plan or security model can instead cause a MAC address and a user name to be modified.

In its simplest form a reactive trigger can be based on a packet inspection based scheme, a congestion level based scheme, a heuristic algorithm based scheme, and/or an NBA analysis based scheme. The packet inspection based scheme can involve analyzing a packet to obtain an identifier identifying an origin of the packet, a destination of the packet, a group to which the origin or destination device belongs, and/or a type of payload contained in the packet. The packet inspection based scheme can also involve analyzing the packet to determine whether a code word is contained therein or absent therefrom. Techniques for achieving such a packet inspection are well known in the art. Any such technique that is now known or known in the future can be used with the present invention without limitation. In some embodiments, a reactive trigger event occurs when a value of the identifier matches a predefined value.

In the packet inspection scenarios, the inclusion of a particular type of content in a packet serves as a trigger or as a parameter for selecting a timing scheme on which a trigger is based. For example, a trigger event could be defined as occurring (a) when a particular person of an entity (e.g., a commander of a military unit) communicates information to other members of the entity, and/or (b) when a particular code word is contained within the packet. Alternatively or additionally, a trigger event could be defined as occurring at the expiration of every N second time interval as defined by a timing scheme selected in accordance with a particular packet inspection application, where N is an integer. In this regard, it should be understood that in some scenarios a first timing scheme can be selected (a) when a first person of an entity (e.g., a commander of a military unit) requests a communication session with other members of the entity or (b) when a particular code word exists within a packet. A second different timing scheme can be selected (a) when a second person of an entity (e.g., a lieutenant commander of a military unit) requests a communication session with other members of the entity or (b) when a second code word exits within a packet, and so on. Embodiments of the present invention are not limited to the particularities of the above provided examples. In this regard, it should be understood that other content included in a packet can define a trigger event. For example, if the payload of a packet includes sensitive or confidential information, then a new mission plan or security model can be selected in accordance with the level of sensitivity or confidentiality of said information.

For such time-based trigger arrangements, one or more of the maneuvering parameters could change every N (e.g., 60) seconds in accordance with a predetermined clock time. In some embodiments, all of the maneuvering parameters can change concurrently so that the changes are synchronized. In a slightly more complex embodiment, a time-based trigger arrangement can also be used, but a different unique trigger time interval can be selected for each maneuvering parameter. Thus, false IDP values could be changed at time interval X, a selection of IDPs would change in accordance with a time interval Y, and a location where such changes are performed would occur at time interval Z, where X, Y and Z are different values.

It will be appreciated that in embodiments of the invention which rely upon clock time as a trigger mechanism, it is advantageous to provide synchronization as between the clocks in various modules 105, 106, 107, 113, 114 to ensure that packets are not lost or dropped due to unrecognized IDPs. Synchronization methods are well known and any suitable synchronization mechanism can be used for this purpose. For example, the modules could be synchronized by using a highly accurate time reference such as a GPS clock time. Alternatively, a unique wireless synchronization signal could be broadcast to each of the modules from a central control facility.

The congestion level based scheme can involve: monitoring and tracking the level of congestion within a computer network; comparing a current level of congestion with a threshold value; and selecting a mission plan or security model from a plurality of mission plans/models based on the results of the comparison. In some scenarios, a new mission plan or security model is selected when the current level of congestion is equal to, greater than or less than the threshold value. In this way, a mission plan or security model change occurs at apparently erratic time intervals based on changes in the level of congestion within a computer network.

The heuristic algorithm based scheme can involve analyzing a network to determine a state thereof. Such a network analysis can involve monitoring traffic patterns (e.g., the number of users), protocol patterns, and/or entropy patterns (i.e., who is communicating with who) of a network at particular times of a day. A traffic pattern can be determined by collecting information about network equipment usage (e.g., a processor's usage) and a number of connections that exist from a network device (e.g., a network server). The collected information can be compared against the contents of a pre-defined table or matrix to identify which of a plurality of possible traffic patterns currently exists within a computer network. Based at least on the results of this comparison operation, a new mission plan or security model can be selected from a plurality of mission plans and/or security models for utilization in the computer network.

In some heuristic scenarios, the mission plans and/or security models can be configured such that a constant high level of traffic is maintained within a computer network despite changes in the amount of actual traffic therein. The constant high level of traffic is maintained by adjusting (i.e., increasing or decreasing) a noise level of a network in accordance with the amount of actual traffic therein. Consequently, the amount of actual traffic and the type of traffic pattern at any given time is masked.

A protocol pattern can be determined by collecting information about user activities related to network resources. Such information can include, but is not limited to, a history of user activities for at least one user of a computer network, times that user activities start, times that user activities stop, times that user activities have elapsed, and information identifying concurrent user activities being performed by at least one user of a computer network. The collected information can be analyzed to determine if a certain protocol pattern currently exists. If it is determined that a particular protocol pattern currently exists, then a new mission plan or security model can be selected from a plurality of mission plans/models for utilization in the computer network. In this way, a mission plan or security model change occurs at apparently erratic time intervals based on changes in protocol patterns (more particularly, changes in user activities).

The entropy pattern can be determined by collecting information about who is communicating with each other over the computer network. Based on the collected information, a new mission plan or security model is selected from a plurality of mission plans/models for utilization in the computer network. In this scenario, a mission plan or security model change occurs at apparently erratic time intervals based on changes of the parties participating in communication sessions.

The NBA analysis is performed for purposes of determining the level of an NBA, a type of an NBA, and/or the number of NBA attacks currently being waged on a computer network. Such NBA analyses are well known in the art, and therefore will not be described herein. Still, it should be understood that such NBA analyses can involve: monitoring and tracking attack events within a computer network; and performing LUT operations for purposes of determining the level of an NBA attack and/or the type of an NBA attack. Any NBA analysis technique that is now known or known in the future can be used with the present invention without limitation. Once the NBA analysis is completed, a new mission plan or security model can be selected from a plurality of mission plans/models for utilization in the computer network based on the results of the NBA analysis. For example, if it has been determined that an NBA is a low level NBA and/or is of a first type, then a first mission plan or security model is selected from a plurality of mission plans or security models. In contrast, if it has been determined that the NBA is a high level NBA and/or is of a second type, then a second different mission plan or security model is selected from the plurality of mission plans or security models. In this scenario, a mission plan or security model change occurs at apparently erratic time intervals based on changes in the level of NBA attacks and/or the types of NBA attacks. Additionally or alternatively, a new mission plan or security model can be selected when two or more NBA attacks of the same or different levels and/or types are currently being waged on the computer network. In this scenario, a mission plan or security model change occurs at apparently erratic time intervals based on changes in the number of attacks currently being performed.

In embodiments of the present invention, an NBA can be identified by a network security software suite. Alternatively, the NBA can be identified upon the receipt of a data packet at a module 105, 106, 107, 113, 114 where the packet contains one or more IDPs that are inconsistent with the present state of network maneuvering. Regardless of the basis for identifying an NBA, the existence of such NBA can serve as a reactive trigger event as described above.

Reactive trigger events based on the above described schemes can cause the same types of network maneuvers. For example, false IDPs, the selection of IDPs and the locations of IDP transformations could remain stable (i.e., unchanged) except in the case where one or more of the following is detected: a packet having a particular origin or destination; a code word contained in a packet; secret or confidential information contained in a packet; a particular level of congestion; a particular traffic pattern; a particular protocol pattern; a particular entropy pattern; an NBA of a particular level and/or type; and a particular number of NBAs currently being waged on a computer network. Such an arrangement might be chosen, for example, in computer networks where frequent network maneuvering is desirable so as to increase the security thereof.

Alternatively, reactive trigger events based on the above described schemes can cause different types of network maneuvers. In such embodiments, a trigger event based on the results of an NBA analysis can have a different effect on the network maneuvering as compared to a trigger event based on the results of a packet inspection and/or a heuristic algorithm. For example, an NBA-based trigger event can cause strategic or defensive changes in the network maneuvering so as to more aggressively counter such NBAs. The precise nature of such measures can depend on the nature of the threat, but can include a variety of responses. For example, different pseudorandom or chaotic algorithms can be selected, and/or the number of IDPs selected for manipulation in each IDP set 120 can be increased. Also, the response can include increasing a frequency of network maneuvering. Thus, more frequent changes can be made with respect to (1) the false IDP values, (2) the selection of IDPs to be changed in each IDP set, and/or (3) the position of the first and second locations where IDP values are changed. Accordingly, the network maneuvering described herein provides a method for changing a mission plan or security model in a purely spontaneous manner based on a variety of factors, thereby increasing the security thereof.

Mission Plans

The network maneuvering described herein is controlled in accordance with a mission plan. A mission plan is a schema that defines and controls maneuverability within the context of a network and at least one security model. As such, the mission plan can be represented as a data file that is communicated from a remote device (e.g., the NAC 104 of FIG. 1 or a remotely located data store) to at least one module 105-107, 113-114 of FIG. 1 and/or from a smart card 150, 152, 154 to at least one module 105-107, 113-114 of FIG. 1, as described herein. Thereafter, in some scenarios, the mission plan can be stored in the module(s) so as to be associated with at least one identifier for a user of the computer network, at least one identifier for a mission of the enterprise, at least identifier for the mission plan, and/or at least one identifier for a smart card, such that it can be identified as the correct mission plan from a plurality of mission plans which should be used by a module when a particular user is logged into a corresponding client computer. The mission plan is thereafter used by one or more modules to control the manipulation of IDP values and coordinate its(their) activities with the actions of the other modules in the network. As noted above, a smart card is generally a pocket-sized card with embedded integrated circuits. As such, each smart card 150, 152, 154 of FIG. 1 can include, but is not limited to, a Common Access Card ("CAC"). CACs are well known in the art, and therefore will not be described in detail herein.

In some scenarios, a mission plan includes, but is not limited to, user identification information for those users who have been assigned to the particular mission for which the mission plan was generated. The mission plan can also include the following source side information: device identification information; IDP identification information for those IDPs that are to have their true values changed to false values; true IDP values; a set of false IDP values (e.g., $FV_1$, $FV_2$, ..., $FV_X$); timing information specifying when to use each false value of the set of false IDP values; a pseudorandom or chaotic function for dynamically generating new false values for the set of false IDP values; rules specifying when to invoke the pseudorandom or chaotic function for generating the new values for the set of false IDP values; rules specifying when to dynamically select which IDPs are to have their true values changed to false values; a rule specifying the number of IDPs to be selected and which IDPs are to be selected for value modification; a rule specifying whether IDPs are to be changed synchronously (i.e., all selected IDPs are changed at the same time) or asynchronously (i.e., the group of IDPs change incrementally as individual IDPs are added or removed from the group of selected IDPs); and a rule for dynamically varying the location within the computer network where the modification or transformation of IDPs takes place. The mission plan may further include the following destination side information: first rules for restoring false values of IDPs to true values; and second rules for dynamically varying the location within the computer network where the modification or restoration of the IDP values takes place. The first rules can include, but are not limited to, rules for determining at least a selection of IDP values that are to be transformed, and/or rules for correct transformation of the selected IDPs from false values to true values (e.g., using at least one LUT). Embodiments of the present invention are not limited in this regard. The source side and destination side information may alternatively be contained in at least two separate mission plans.

A mission plan can be modified from time to time manually by a network administrator and/or automatically by a Network Control Software Application ("NCSA") ("NCSA") to update or change the way in which the network maneuvers to thwart potential adversaries. As such, the mission plan may provide a network administrator and/or the NCSA with a means for complete control over the time, place and manner in which network maneuvering will occur within the network. Such update ability allows the network administrator and/or the NCSA to tailor the behavior of the computer network to the current operating conditions and more effectively thwart adversary efforts to infiltrate the network.

Multiple mission plans can be manually defined by a user and/or automatically generated by the NCSA. The mission plans can then be stored in NAC 104, a centralized database, and/or on a smart card 150-154 of FIG. 1. In all of these scenarios, the mission plans are accessible to modules within the network. For example, the multiple mission plans can be stored at NAC 104 and/or on at least one smart card 150-154, and communicated therefrom to the modules as needed. Alternatively, a plurality of mission plans can be stored on each module and can be activated as necessary or desirable to maintain security of the network. For example, if the network administrator and/or NCSA determines or suspects that an adversary has discovered a current mission plan for a network, the administrator and/or NCSA may wish to change the mission plan. Effective security procedures can also dictate that the mission plan be periodically changed. For example, a mission plan can be activated when a user's identity has been verified via information stored on a smart card, as discussed below.

Manual Generation of Mission Plans

Figure 3:
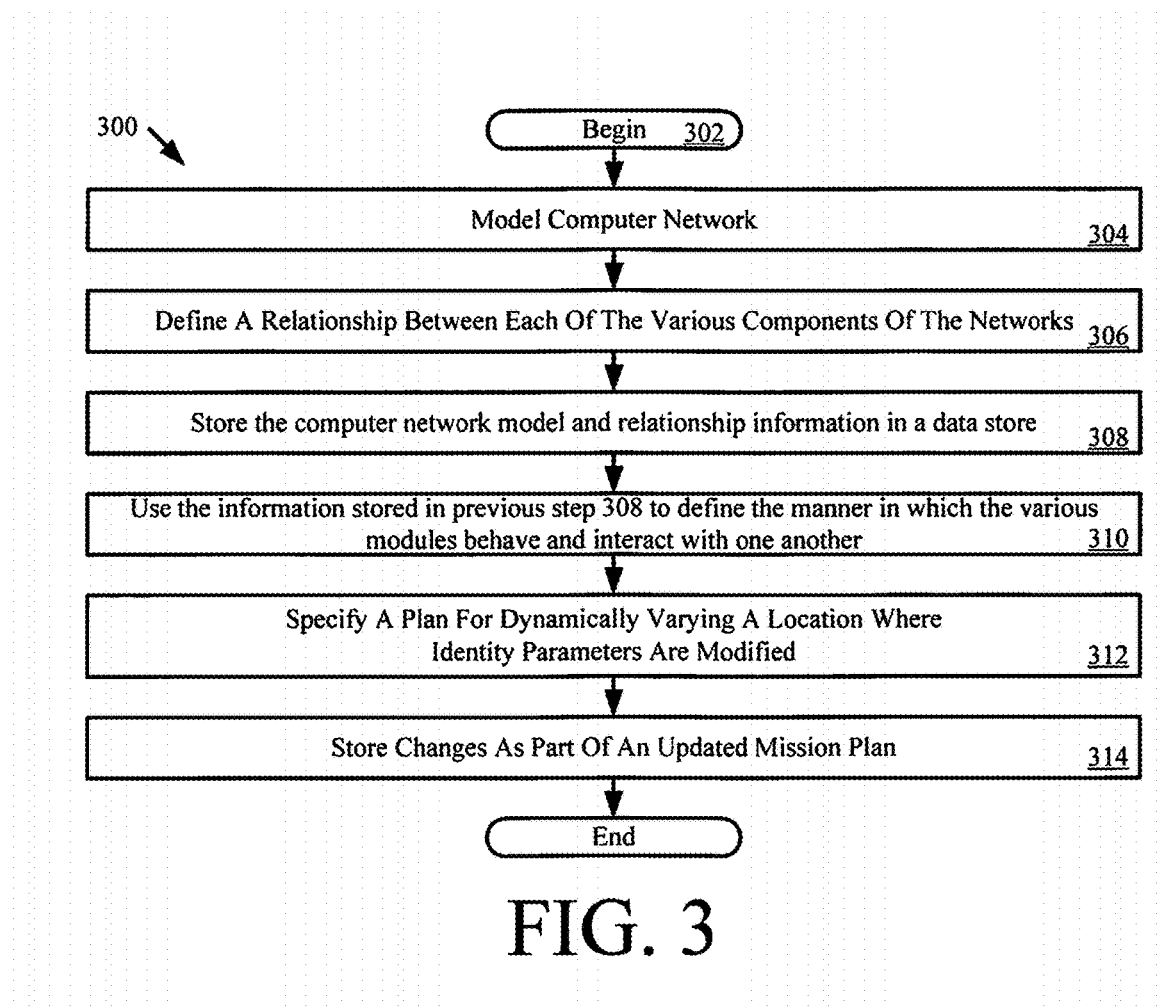
FIG. 3 is a flow diagram of an exemplary process for manually generating a mission plan.

Referring now to FIG. 3, there is provided a flow diagram of an exemplary process 300 for manually generating a mission plan. The order of the method steps shown in FIG. 3 is exemplary. The present invention is not limited to this order. For example, steps 308-312 can be performed in any sequential order or alternatively in parallel.

The process of generating a mission plan can begin by modeling the computer network 100, as shown by step 302. The creation of the model is facilitated by the NCSA executing on a computer or server at the network command center. For example, in the embodiment shown in FIG. 1, the NCSA can execute on the NAC 104 of FIG. 1. The network model preferably includes information which defines data connections and/or relationships between various computing devices included in the computer network 100. The NCSA will provide a suitable interface which facilitates entry of such relationship data. In some scenarios, the NCSA can facilitate entry of data into tables which can be used to define the mission plan. However, in other scenarios, a graphic user interface is used to facilitate this process.

Figure 4:
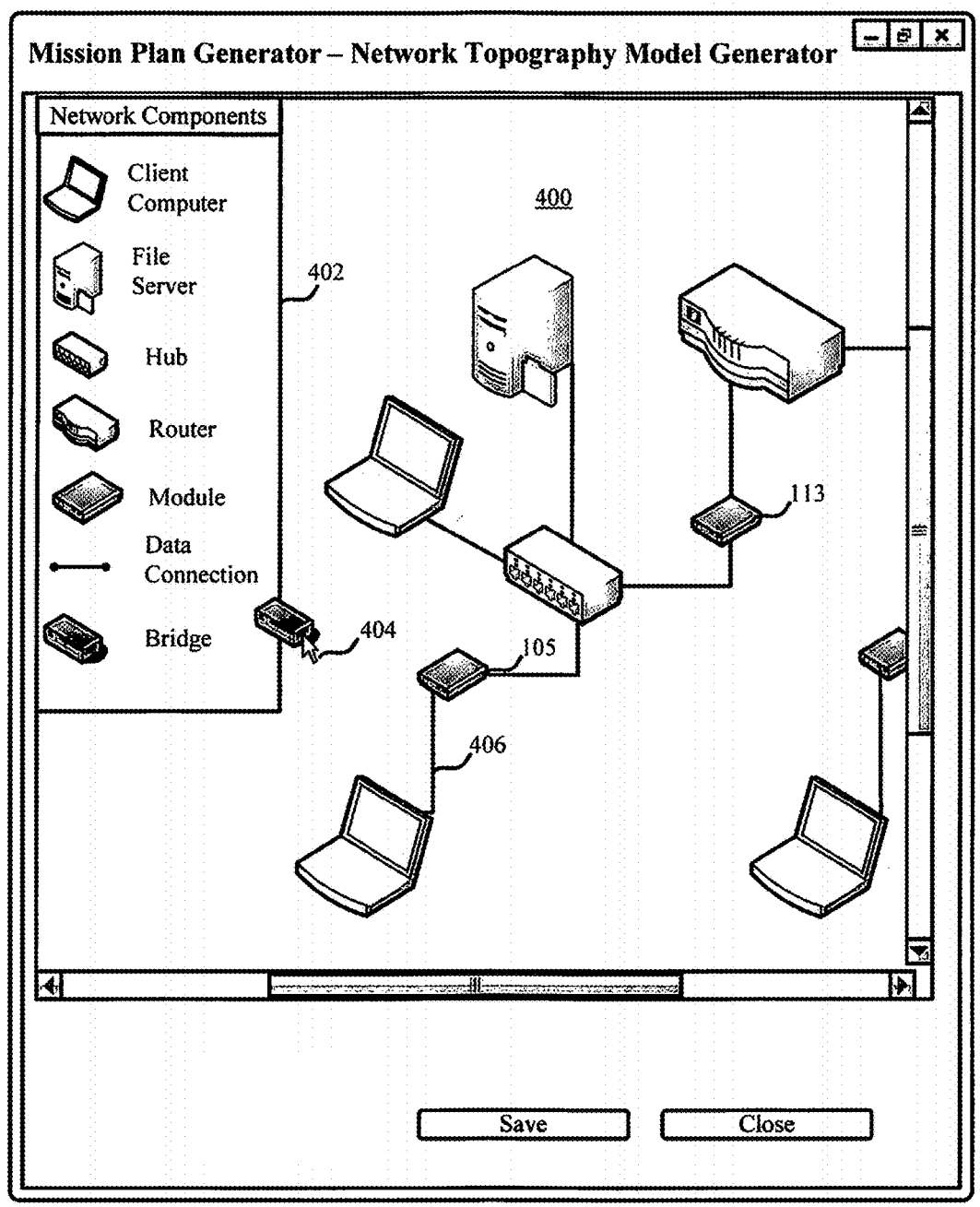
FIG. 4 is a drawing that is useful for understanding a tool that can be used to help characterize the network in FIG. 1.

In a next step 304, the network administrator performs user-software interactions for defining the relationship between each of the various components of the networks. In some scenarios, these user-software interactions are achieved using a Network Topography Model Generator ("NTMG") tool provided by the NCSA. The NTMG tool is used to assist the network administrator in defining the relationship between each of the various components of the networks. The NTMG tool provides a workspace 400 as shown in FIG. 4 in which the network administrator can drag and drop network components 402, by using a cursor 404. The network administrator can also create data connections 406 between various network components 402. As part of this modeling process, the network administrator can provide network address information for the various network components, including the modules 105-107, 113, 114 of FIG. 1.

Once the network has been modeled, it can be saved in a data store of the system as shown by step 308 of FIG. 3. Thereafter, the network administrator uses the stored information to define the manner in which the various modules 105-107, 113, 114 behave and interact with one another. In this regard, the NCSA can generate a GUI (e.g., a window or a dialog box) of which can be used by the network administrator to further develop a mission plan. A schematic illustration of an exemplary embodiment 500 of this GUI is provided in FIG. 5.

Figure 5:
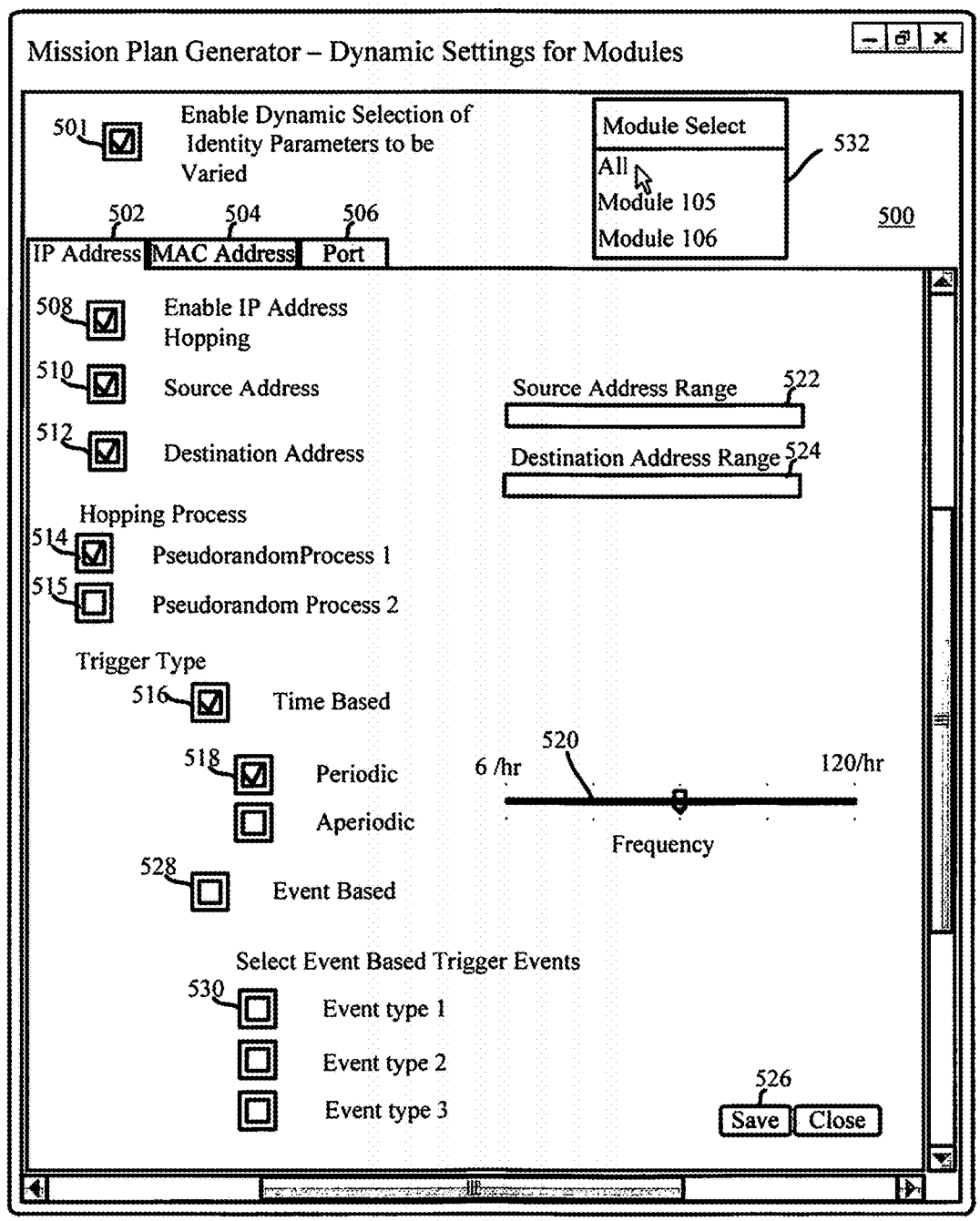
FIG. 5 is an example of a Graphical User Interface ("GUI") that can be used to select dynamic settings for modules in FIG. 1.

As shown in FIG. 5, a drop-down menu 532 can be used to select the particular module (e.g., module 105 of FIG. 1) to which the settings in GUI 500 are to be applied. Alternatively, the network administrator can use drop-down menu 532 to indicate that the settings in GUI 500 are intended to be applied to all modules within the network (e.g., by selecting the command "All" in the drop-down menu 532). The process can continue by specifying whether a fixed set of IDPs will always be modified in each of the modules, or whether the set of IDPs that are manipulated shall be dynamically varied. If the selection or set of IDPs that are to be manipulated in the modules is intended to be dynamically varied, the network administrator can mark check-box 501 to indicate that preference. If the check-box 501 is not marked, then the set of IDPs to be varied is a fixed set that does not vary over time.

The GUI 500 includes tabs 502, 504, 506 which allow a user to select the particular IDP that (s)he wants to work with for purposes of creating a mission plan. For purposes of this disclosure, the GUI 500 facilitates dynamic variation of only three IDPs. Specifically, these include the IP address, MAC address and port address. More or fewer IDPs can be dynamically varied by providing additional tabs, but the three IDPs noted are sufficient to explain the inventive concepts. In FIG. 5, the user has selected the tab 502 to work with the IP address type of IDP. Within tab 502, a variety of user interface controls 508-520 are provided for specifying the details relating to the dynamic variation of IP addresses within the selected module. More or fewer controls can be provided to facilitate the dynamic manipulation of the IP address type, and the controls shown are merely provided to assist the reader in understanding the concept. In the example shown, the network administrator can enable dynamic variation of IP addresses by selecting (e.g., with a pointing device such as a mouse) the check-box 508 marked: "Enable IP Address Hopping". Similarly, the network administrator can indicate whether the source address, destination address or both are to be varied. In this example, the source and destination address boxes 510, 512 are both marked, indicating that both types of addresses are to be changed. The range of allowed values for the source and destination addresses can be specified by the administrator in list boxes 522, 524.

The particular pseudorandom or chaotic process used to select false IP address values is specified by selecting a pseudorandom or chaotic process. This selection is specified in boxes 514, 515. Different pseudorandom or chaotic processes can have different levels of complexity for variable degrees of true randomness, and the administrator can choose the process that best suits the needs of the computer network 100.

GUI 500 also allows a network administrator to set the trigger type to be used for the dynamic variation of the IP address IDP. In this example, the user has selected box 516, indicating that a time based trigger is to be used for determining when to transition to new false IP address values. Moreover, checkbox 518 has been selected to indicate that the time based trigger is to occur on a periodic basis. Slider 520 can be adjusted by the user to determine the frequency of the periodic time based trigger. In the example shown, the trigger frequency can be adjusted between six trigger occurrences per hour (trigger every ten minutes) and one hundred twenty trigger occurrences per hour (trigger every thirty seconds). In this example, selections are available for other types of triggers as well. For example, dialog box 502 includes check boxes 528, 530 by which the network administrator can select an event-based trigger. Several different specific event types can be selected to form the basis for such event-based triggers (e.g., Event type 1, Event type 2, etc.). These event types can include the detection of various potential computer network security threats. In FIG. 5, tabs 504 and 506 are similar to tab 502, but the controls therein are tailored to the dynamic variation of the MAC address and port value rather than the IP address. Additional tabs could be provided for controlling the dynamic variation of other types of IDPs.

Referring again to FIG. 3, the process 300 continues with step 312 where the network administrator specifies a plan for dynamically varying the location where IDPs are modified. In some embodiments, this variable location feature is facilitated by controlling a sequence that defines when each module is in an active state or a bypass state. Accordingly, the NCSA advantageously includes some GUI means of specifying this sequence. In some scenarios, this can involve the use of defined time intervals or time slots, which are separated by the occurrence of a trigger event. A schematic illustration of an exemplary GUI 600 that facilitates such specifications by the network administrator is provided in FIG. 6.

Figure 6:
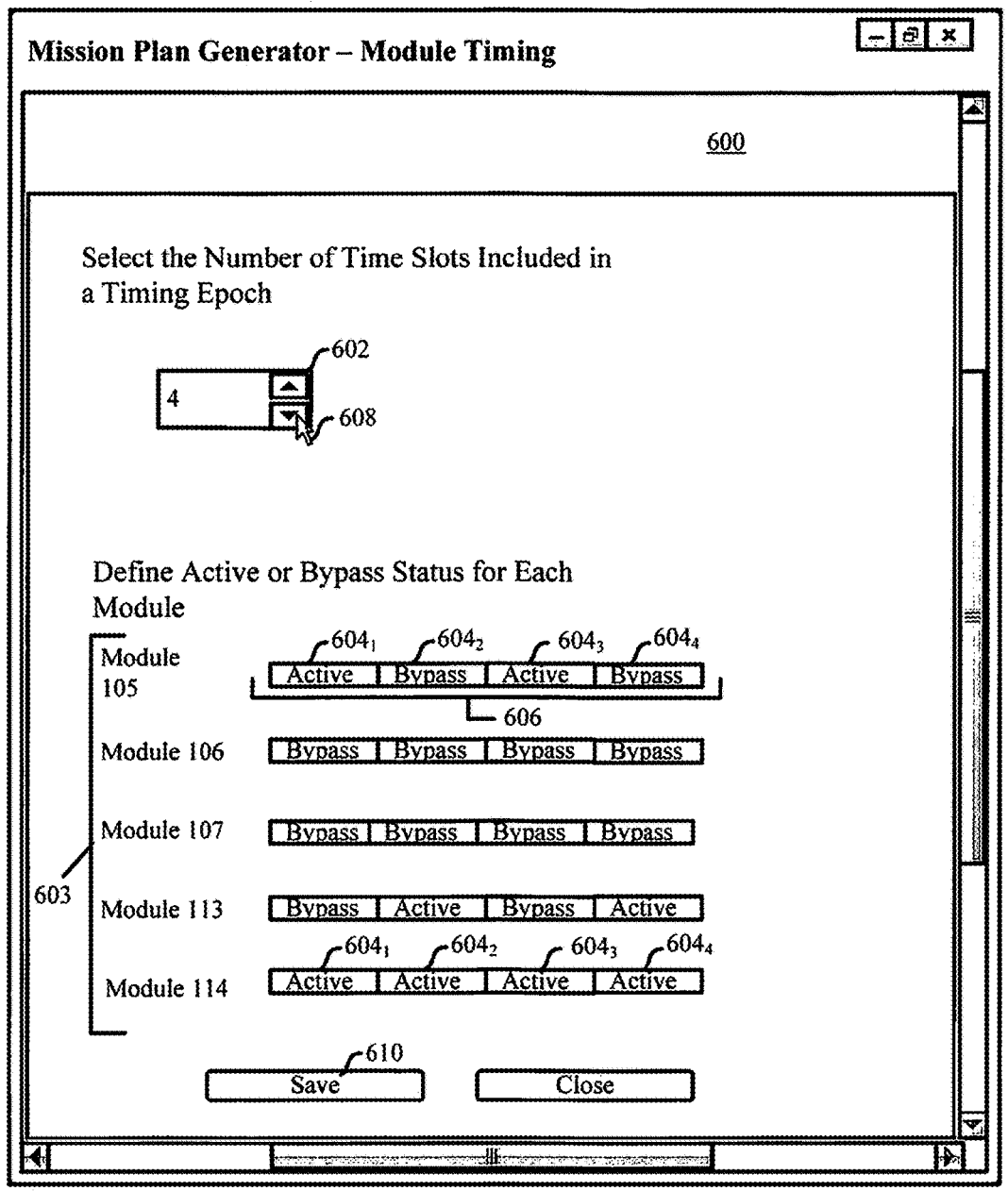
FIG. 6 is an example of a GUI that can be used to select a sequence of active states and bypass states associated with each module in FIG. 1.

As shown in FIG. 6, a GUI 600 can be provided by the NCSA to facilitate coordination and entry of location sequence and timing information. GUI 600 can include a control 602 for selecting a number of time slots $604_1$-$604_n$ which are to be included within a time epoch 606. In the example illustrated, the network administrator has defined four time slots per timing epoch. The GUI 600 can also include a table 603 which includes all modules in the computer network 100. For each module listed, the table includes a graphical representation of available time slots $604_1$-$604_4$ for one timing epoch 606. Recall that dynamic control over the location where IDPs are manipulated is determined by whether each module is in an active or bypass operating states. Accordingly, within the GUI, the user can move a cursor 608 and make selections to specify whether a particular module is in an active or bypass mode during each time slot. In the example shown, module 105 is active during time slot $604_1$ and $604_3$, but is in a bypass mode during time slots $604_2$, $604_4$. Conversely, module 113 is active during time slots $604_2$, $604_4$, but is in bypass mode during time slots $604_1$ and $604_3$. With reference to FIG. 1, this means that manipulation of IDPs occurs at a location associated with module 105 during time slots $604_1$ and $604_3$, but occurs instead at module 113 during time slots $604_2$, $604_4$.

In the example shown in FIG. 6, the network administrator has elected to have module 114 always operate in an active mode (i.e., module 114 is active during all time slots). Accordingly, for data communications transmitted from client computer 101 to client computer 103, data packets will alternately be manipulated in modules 105, 113, but will always be manipulated at module 114. Finally, in this example, the network administrator has elected to maintain modules 106 and 107 in a bypass mode during time slots $604_1$-$604_4$. Accordingly, no manipulation of IDPs will be performed at these modules during any of the defined time slots.

Referring again to FIG. 3, the network administrator can store the changes as part of an updated mission plan, as shown by step 314. For example, once the module timing has been defined in GUI 600, the network administrator can select the button 610 of FIG. 6 to store the changes as part of an updated mission plan. The mission plan can be saved in various formats. In some scenarios, the mission plan can be saved as a simple table or other type of defined data structure that can be used by each module for controlling the behavior of the module. As noted above, the mission plan can be stored in NAC (e.g., NAC 104 of FIG. 1) and/or a centralized database. Thereafter, the mission plan may be loaded onto one or more smart cards (e.g., smart card 150, 152 and/or 154 of FIG. 1) or other access control means.

Automatic and Dynamic Generation of Mission Plans

In some scenarios, at least one mission plan is dynamically and automatically generated by the NCSA during operation of the computer network (e.g., computer network 100 of FIG. 1). The dynamic generation of a mission plan is achieved by considering (1) the CONcept of OPerationS ("CONOPS"), (2) the computing infrastructure resources and network assets, (3) the relationships between the infrastructure resources and network assets, (4) the detected activity within the computer network, and/or (5) effectiveness ratings associated with IDPs.

Figure 7:
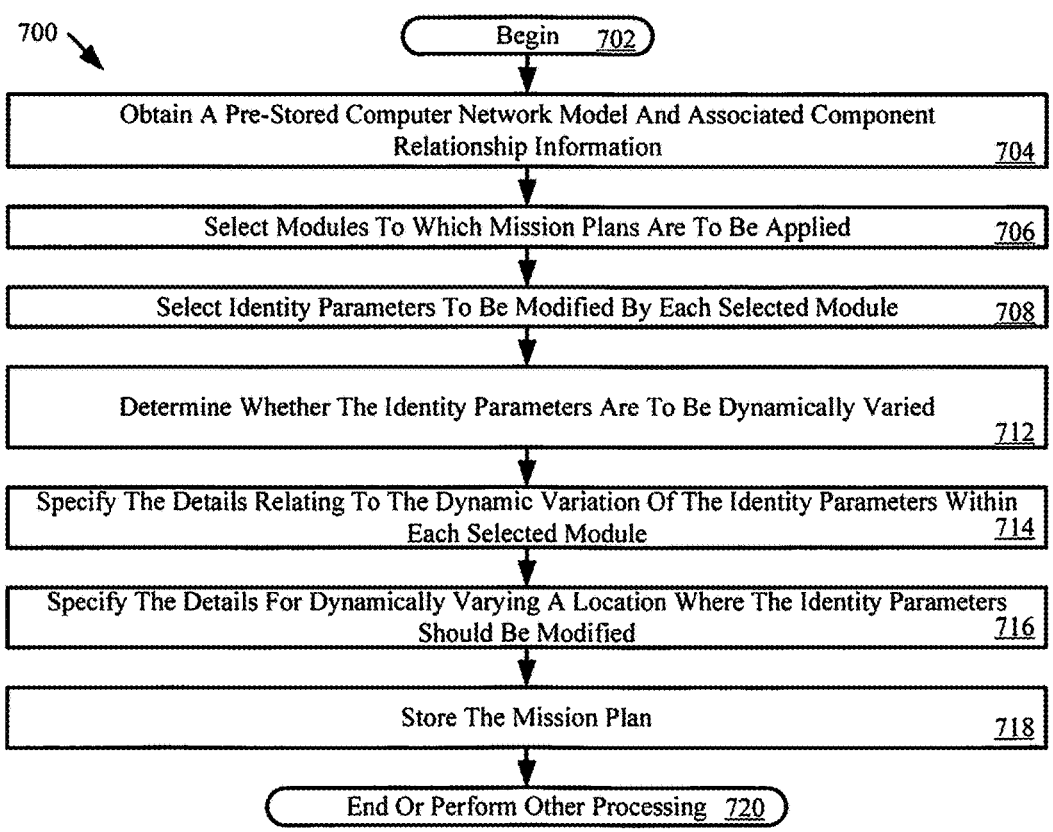
FIG. 7 is a flow diagram of an exemplary process for automatically and dynamically generating a mission plan.

A flow diagram of an exemplary automatic process 700 performed by the NCSA for dynamically generating mission plans is provided in FIG. 7. As shown in FIG. 7, process 700 begins with step 702 and continues with step 704. In step 704, a pre-stored computer network model and associated component relationship information is obtained by the NCSA. Next, in step 706, the NCSA performs operations to select modules of the computer network model (e.g., modules 105, 106, 107, 113 and/or 114 of FIG. 1) to which at least one mission plan is to be applied.

Thereafter, in step 708, at least one IDP to be modified is selected for each of the selected modules. In some scenarios, the IDP(s) include(s), but is not limited to, an IP address, a MAC address and/or a port number. The IDP(s) can be selected based on (1) the CONOPS, (2) the type of attack on the computer network which was previously detected by the NCSA, and/or (3) the effectiveness rating associated with the IDPs. For example, if the CONOPS objective is to maintain confidential communications and the type of malicious attack detected on the computer network is a Level 1 attack, then the IDP(s) include(s) the IDP(s) with an effectiveness rating of Level 1 (e.g., only an IP address). In contrast, if the CONOPS objective is to maintain confidential communications and the type of malicious attack detected on the computer network is a Level 2 attack, then the IDP(s) include(s) the IDP(s) with an effectiveness rating of Level 2 (e.g., an IP address and a port number). If the CONOPS objective is to maintain confidential communications and the type of malicious attack detected on the computer network is a Level 3 attack, then the IDP(s) includes the IDP(s) with an effectiveness rating of Level 3 (e.g., an IP address and a MAC address). If the CONOPS objective is to maintain confidential communications and the type of malicious attack detected on the computer network is a Level 4 attack, then the IDP(s) includes the IDP(s) with an effectiveness rating of Level 4 (e.g., an IP address, a MAC address, and a port number). Embodiments of the present invention are not limited to the particularities of this example.

Next in step 712, a determination is made as to whether the IDP(s) is(are) to be dynamically varied. If the IDP(s) is(are) to be dynamically varied, then step 714 is performed where the details relating to the dynamic variations are specified. In this regard, step 714 can involve: enabling IDP hopping for each IDP to be dynamically varied; indicating whether source and/or destination IDP(s) is(are) to be varied; specifying a range of allowed values for each IDP; select a pseudo-random function or a chaotic function to be used to generated false values for each IDP; and/or setting a trigger type to be used for the dynamic variation of a value for each IDP. Each of these listed operations can be based on (1) the CONOPS objectives and/or (2) the type of detected activity within the computer network. For example, if the CONOPS objective is to maintain the secrecy of all communication sources and a Level 1 attack has been detected, then only source IDPs are to be dynamically modified based on a first pseudo-random function. In contrast, if the CONOPS objective is to maintain the secrecy of all communication destinations and a Level 2 attack has been detected, then only the destination source IDPs are to be dynamically modified based on a second different pseudo-random function. If the CONOPS objective is to maintain the secrecy of all communication sources/destinations and a Level 3 attack has been detected, then the source/destination IDPs are to be dynamically modified based on at least one third different pseudo-random function. If the CONOPS objective is to maintain the secrecy of all communication sources/destinations and a Level 4 attack has been detected, then the source/destination IDPs are to be dynamically modified based on at least one chaotic function. Embodiments of the present invention are not limited to the particularities' of this example.

Upon completing step 714, step 716 is performed where the additional details are specified for dynamically varying a location where the IDPs should be modified. In this regard, step 716 involves selecting the number of timeslots which are to be included within a time epoch for each of the selected modules. This selection can be based on a distance vector, which is described above. In a next step 718, the mission plan(s) is(are) stored. Subsequently, process 700 ends or other processing is performed.

Mission Plan Conflict Analysis

Once two or more mission plans have been generated, the NCSA performs operations to identify and resolve any conflicts between module operations defined thereby. In some scenarios, the conflict analysis is performed each time a new mission plan is generated by the network administrator and/or the NCSA, and prior to distribution and loading of the new mission plan as described below.

Figure 8:
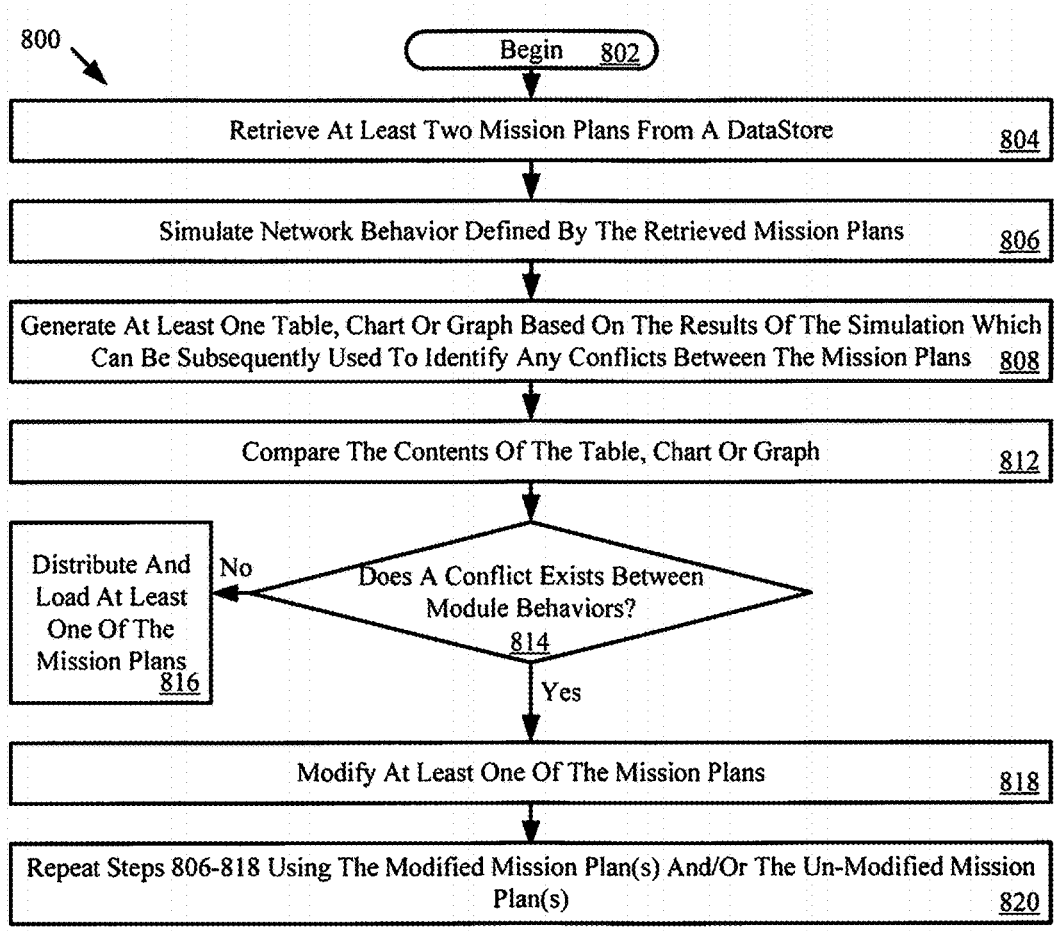
FIG. 8 is an exemplary process for identifying and resolving mission plan conflicts.

A schematic illustration of an exemplary process 800 for identifying and resolving mission plan conflicts is provided in FIG. 8. As shown in FIG. 8, process 800 begins with step 802 and continues with step 804. In step 804, at least two mission plans are retrieved from a data store. The retrieved mission plans can include, but are not limited to, a newly generated mission plan (i.e., one that has not yet been distributed and loaded) and/or a pre-generated mission plan (i.e., one that was pre-generated but has or has not been distributed and loaded).

The retrieved mission plans are then used in step 806 for simulating the network behavior defined thereby. For example, a first mission plan specifies that: a true value of a first source IP address is to be modified to a false value at module 105 during a first pre-defined time period; the false value is to be selected from a defined set of false values based on a first pseudo-random function; and the false value is to be re-selected every ten seconds. A second mission plan specifies that: a true value for a second source IP address is to be modified to a false value at module 105 during a second pre-defined period of time that at least partially overlaps the first pre-determined period of time; the false value is to be dynamically selected from a defined set of false values based on a second pseudo-random function; and the false value is to be re-selected every hour. In this case, the operations of module 105 are simulated as defined in the first and second mission plans.

Based on the results of the simulation, at least one table, chart or graph is generated in step 808 which can be subsequently used to identify any conflicts in module behaviors as a result of implementing the mission plans. For example, the table, chart and/or graph may include, but is not limited to, information indicating (1) the false values of the first source IP address at all times during the first pre-defined period of time and (2) the false values of the second source IP address at all times during the second pre-defined period of time.

Next in step 812, the contents of the table(s), chart(s) and/or graph(s) are compared to each other. Based on the results of this comparison, a decision is made in step 814 as to whether any conflict exists between module behaviors defined by the mission plans. For example, in some scenarios, a decision is made as to whether false values for the first and second source IP addresses are the same at any given time within the overlapping period of the first and second per-determined periods of time.

If a determination is made that a conflict does not exists between module behaviors defined by the mission plans [814:NO], then step 816 is performed where at least one of the mission plans is distributed and loaded. The manner in which the mission plans are distributed and loaded will be described in detail below.

If a determination is made that a conflict does exists between module behaviors defined by the mission plans [814:YES], then step 818 is performed where at least one of the mission plans is modified. Thereafter, step 820 is performed where process 800 is repeated using the modified mission plan(s) and/or the un-modified mission plan(s).

Distribution and Loading of Mission Plans

The distribution and loading of mission plans as disclosed herein will now be described in further detail. Referring once again to FIG. 1, it can be observed that the modules 105-107, 113, 114 are distributed throughout the computer network 100 at one or more locations. The modules 105-107, 113, 114 are integrated within the communications pathways to intercept communications at such locations, perform the necessary manipulations, and forward data to other computing devices within the computer network 100. With the foregoing arrangement, any necessary maintenance of the modules 105-107, 113, 114 described herein (e.g., maintenance to update a mission plan) will have the potential to disrupt network communications while the modules are replaced or reprogrammed. Such disruptions are undesirable in many situations where reliability and availability of network services is essential. For example, uninterrupted network operation can be essential for computer networks used by military, emergency services and businesses.

In order to ensure uninterrupted network operations, each module 105-107, 113, 114 has several operating states. These operating states include, but are not limited to, (1) an off state in which the module is powered down and does not process any packets, (2) an initialization state in which the module installs software scripts in accordance with the mission plan, (3) an active state in which data is processed in accordance with a current mission plan, and (4) a bypass state in which packets can flow through the module as if the module was not present. The module is configured so that, when it is in the active state or the bypass state, the module can receive and load an updated mission plan provided by a network administrator, the NCSA, and/or smart card.

The module operating states can be manually controlled by the network administrator by means of the NCSA executing, for example, on NAC 104. For example, the network administrator can select operating states for various modules through the use of a GUI control panel of NAC 104. The module operating states can also be manually controlled by users of the corresponding client computers 101, 102, and/or 103 of FIG. 1. For example, a user of client computer 101 can activate a physical switch of module 105, activate a virtual switch of the module 105 via a GUI presented on client computer 101, and/or swipe the smart card 150 in a card reader (not shown in FIG. 1) coupled to the module 105. In all of these scenarios, a command is provided for placing the module in a particular one of its states (e.g., an active state or a bypass state).

Alternative to the manual processes described in the previous paragraph, the module operating states can be automatically controlled by the NCSA executing, for example on NAC 104. Commands for controlling the operating states of the network are communicated over the computer network 100, or can be communicated by any other suitable means. For example, a separate wired or wireless network (not shown) can be used for that purpose. The operating states of the modules can also be automatically controlled by a client computer 101, 102 or 103 of FIG. 1 in response to the reception of information from a user and/or smart card. For example, client computer 101 controls the operating state of module 105 in response to: information obtained from the user via a non-access card based control technique (e.g., a conventional user login technique in which a username and password are employed to authenticate a user); and/or (b) information obtained from reading a smart card. In scenario (b), the client computer 101 comprises a smart card reader. Smart card readers are well known in the art, and therefore will not be described herein.

Figure 9:
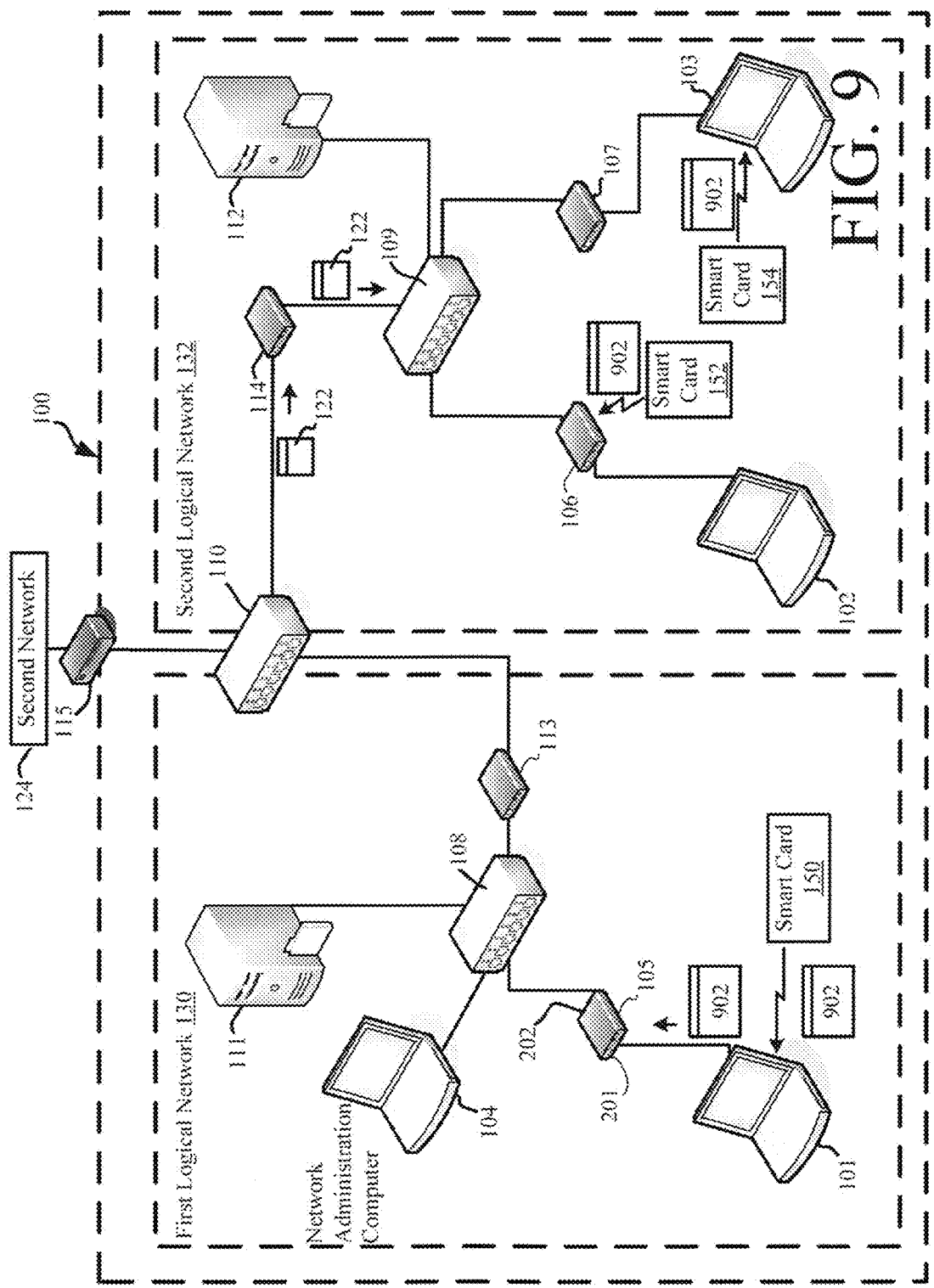
FIGS. 9-10 each provide a diagram that is useful for understanding the way in which a mission plan can be communicated to a plurality of modules in the network in FIG. 1.

In some scenarios, the mission plan can be loaded directly at the physical location of one or more modules via smart card technology. The mission plan can be downloaded from the smart card in response to an authentication of a user's identity. This concept is illustrated in FIG. 9. As shown in FIG. 9, a user gains access to computing device 101 or 103 via a smart card access control technique. Smart card access control techniques are well known in the art, and therefore will not be described herein. Still, it should be noted that the user gains access to the computer 101 or 103 when his/her identity has been authenticated or verified using authentication information stored on the smart card and/or input by the user. Such authentication information can include, but is not limited to, a user name, a password, and/or biometric data (e.g., fingerprint data and/or retinal scan data). Once the user has obtained access to client computer 101 or 103, a mission plan 902 is communicated from smart card 150 or 154 to client computer 101 or 103. In this regard, it should be understood that the mission plan 902 was previously stored on a data store of the smart card 150 or 154. The mission plan 902 is then transmitted to the client computer 101 or 103 via a smart card reader (not shown in FIG. 9). The smart card reader can be internal or external to the client computer 101 or 103. The mission plan 902 is then forwarded from the client computer 101 or 103 to the module 105 or 107. In some scenarios, the mission plan 902 is stored on the smart card 150 or 154 in an encrypted form, and communicated from client computer 101 or 103 to module 105 or 107 in an encrypted or decrypted form. The decryption key can be obtained from the smart card 150 or from a remote data store.

As also shown in FIG. 9, the mission plan 902 is communicated directly from smart card 152 to module 106. This communication can be achieved using a smart card reader (not shown in FIG. 9) internal to or external to module 106. In this scenario, the mission plan 902 may be downloaded to module 106 subsequent to a successful user authentication process. Also, the mission plan 902 may be sent in an encrypted or a decrypted form. The cryptographic key may be retrieved from a central data store of the computer network 100 or from the smart card 152.

Figure 10:
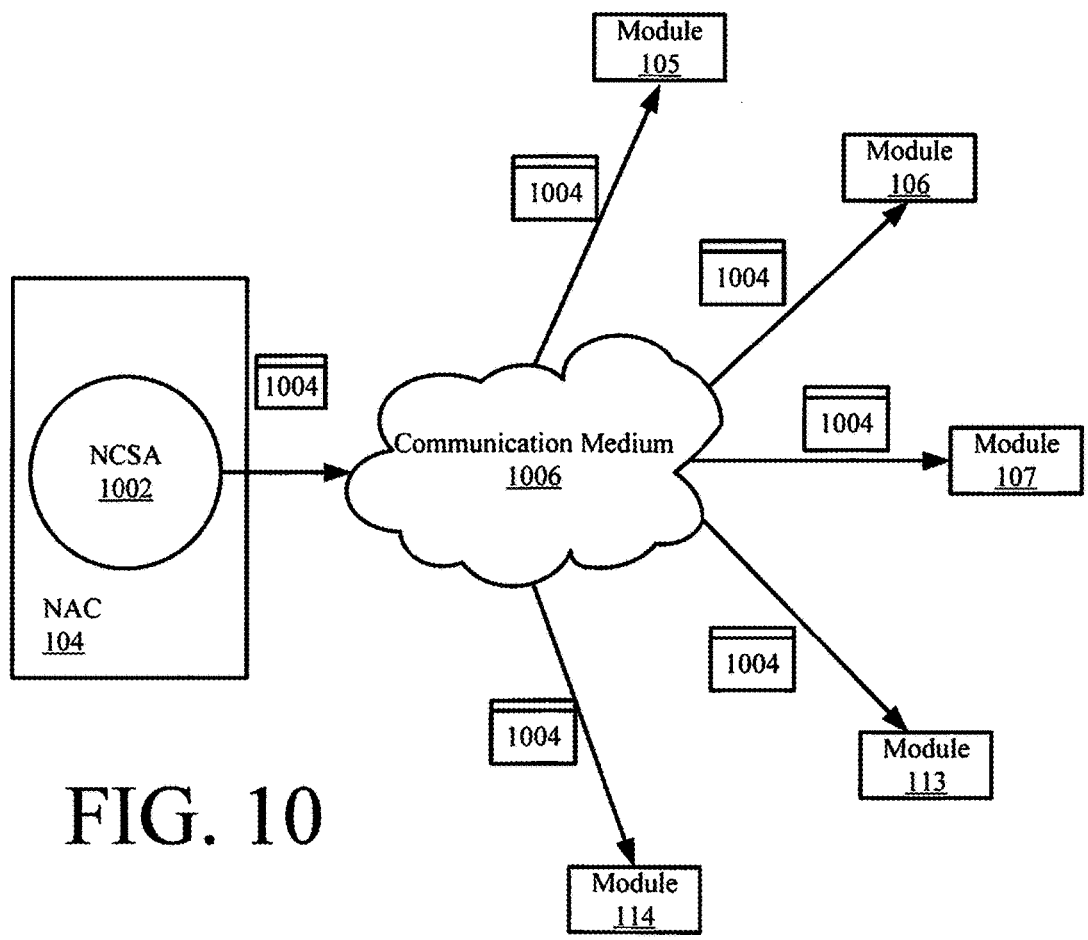

In some scenarios, the mission plan(s) can additionally or alternatively be communicated to one or more modules from a remote location via the NCSA. This concept is illustrated in FIG. 10, which shows mission plans 1004 being communicated from NCSA 1002 to each of the modules 105-107, 113, 114 over a communication medium 1006. In the example shown, the NCSA software application is executing on NAC 104. The communication medium can in some embodiments include in-band signaling using computer network 100. Alternatively, an out-of-band network (e.g., a separate wireless network) can be used as the communication medium 1006 to communicate the updated mission plan from the NCSA to each module.

Figure 11:
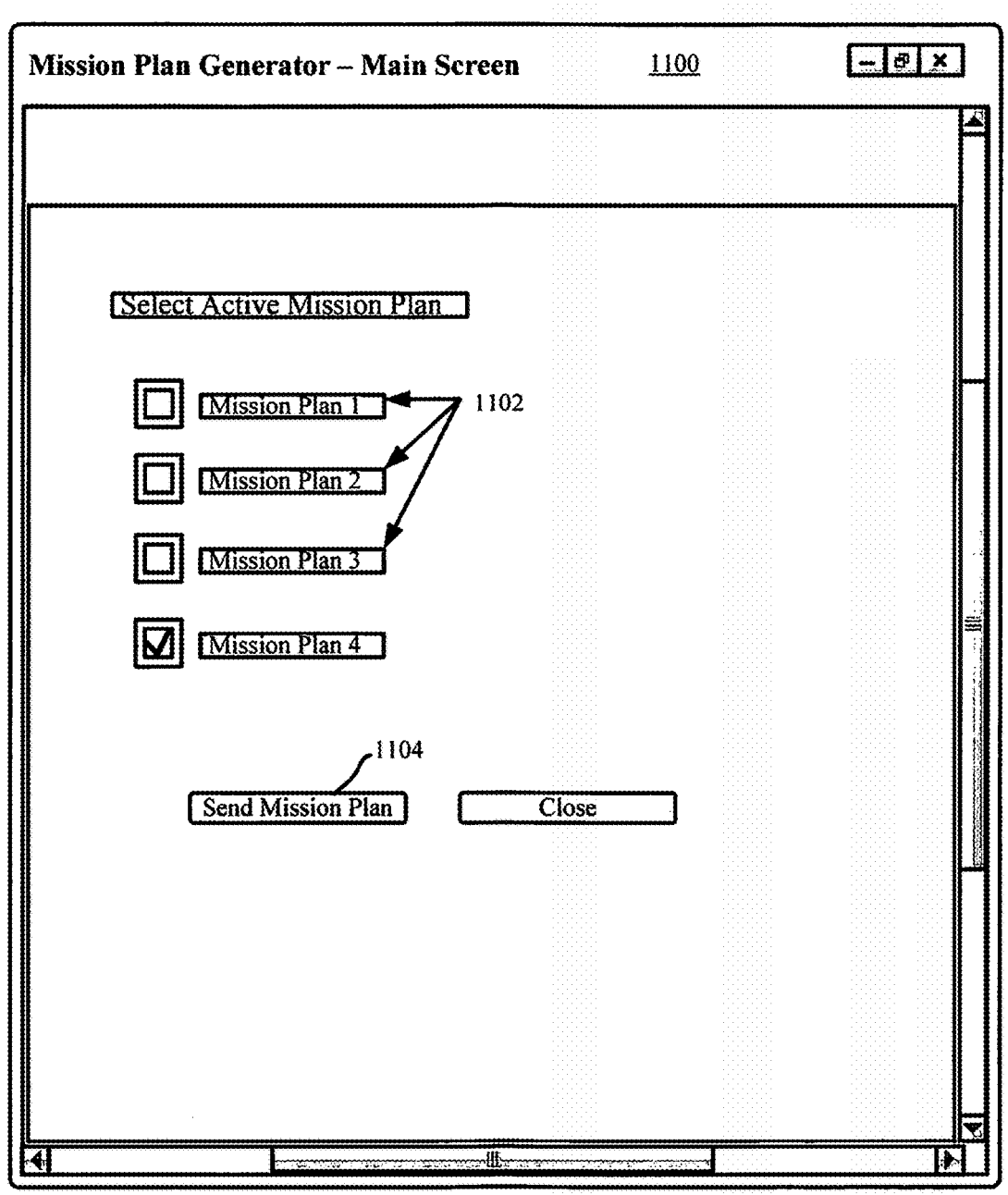
FIG. 11 is a schematic illustration of an exemplary GUI that can be used to select a mission plan from a plurality of mission plans and communicate the selected mission plan to the modules as shown in FIG. 10.

In scenarios where the NAC is being controlled by a network administrator, the NCSA can provide a GUI 1100 to facilitate selection of at least one of several mission plans 1102, as shown by FIG. 11. Each of these mission plans 1102 can be stored on NAC 104. The network administrator can select at least one of the several mission plans 1102, after which the network administrator can activate a "Send Mission Plan" button 1104. In response to activation of the "Send Mission Plan" button 1104, the mission plan is communicated to the module(s) for storage thereon. Subsequently, the mission plan(s) is(are) activated such that the module(s) operate in accordance with the maneuvering behavior specified thereby. The mission plan(s) can be manually activated by the network administrator and/or a user of a respective computing device. Additionally or alternatively, the mission plan(s) can be automatically activated in response to a successful access control process performed at the respective client computer 101, 102, and/or 103. The access control process can include, but is not limited to, a smart card access control process in which a user logs into the system and a mission plan is activated based on information received from the smart card and/or in response to a successful user loggin. In some smart card access control scenarios, the mission plan(s) is deactivated when the corresponding mission(s) is(are) completed and/or when the user logs off of the system.

In scenarios where network maneuverability is automatically controlled, the NCSA (a) selects at least one mission plan from a plurality of mission plans and/or (b) generates at least one new mission plan based on the results of a conflict analysis such as that described above. After which, the NCSA generates a command to send the newly selected and/or generated mission plan(s) to the module(s). In response to the command to send the mission plan(s) to one or more modules, the newly selected or generated mission plan(s) is(are) communicated to the module(s) while it(they) is(are) in an active state in which it(they) is(are) configured for actively performing dynamic modification of IDPs as described herein. Such an arrangement minimizes the time during which the network operates in the clear and without manipulating IDPs. However, the newly selected or generated mission plan(s) can also be communicated to the modules while it(they) is(are) in the bypass mode, and this approach may be desirable in certain cases.

Once the newly selected or generated mission plan(s) is(are) received by the module(s), the module(s) is(are) automatically stored in a memory location within the module(s). Thereafter, the module(s) can be caused to enter the bypass state and, while still in that state, the module(s) can load the data associated with the newly selected or generated mission plan(s) from the memory location in which it was previously stored. This process of entering into the bypass state and loading the new mission plan data can occur automatically in response to receipt of the mission plan, can occur in response to a command from the NCSA software controlled by the network administrator, and/or can occur in response to a command from a smart card or client computer controlled by a user of the system. The new mission plan may include changes in the way that IDP values are varied.

Once the new mission plan has been loaded, the modules 105-107, 113, and 114 can be transitioned from the bypass mode to the active mode in a synchronized way to ensure that data communication errors do not occur. The mission plan(s) can specify a time when the module(s) is(are) to return to the active mode, or the network administrator can use the NCSA to communicate a command to the module(s), directing it(them) to enter into the active mode. The foregoing process of updating mission plan(s) advantageously allows changes in network security procedures to occur without disrupting communication among the various computing devices attached to the computer network 100.

The dynamic manipulation of various IDPs at each module 105, 106, 107, 113, and 114 is controlled by the application software executing on each module 105-107, 113, 114. However, the behavior of the application software is advantageously controlled by the mission plan(s).

Module Operations

Figure 12:
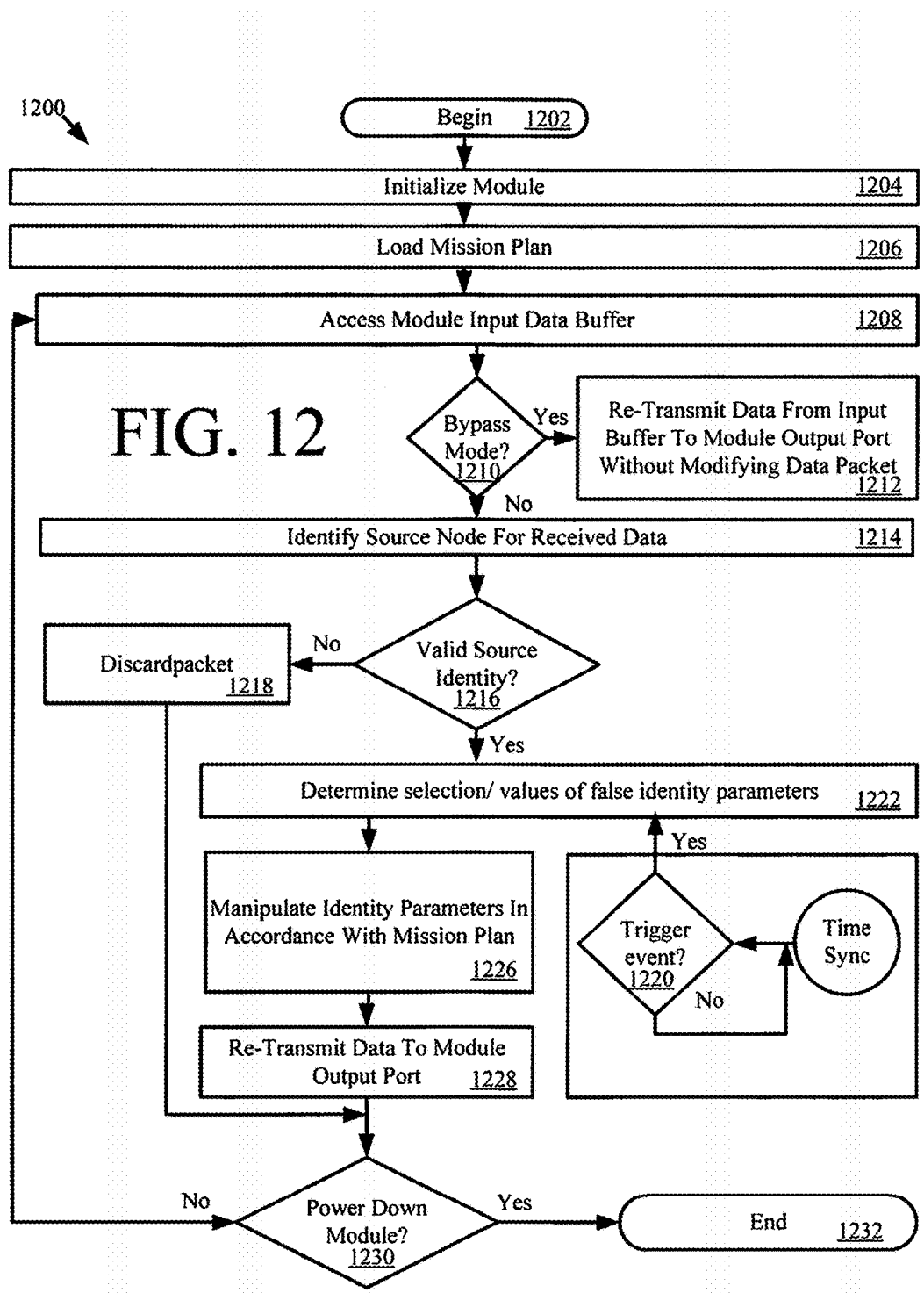
FIG. 12 is a flowchart that is useful for understanding the operation of a module in FIG. 1.

Referring now to FIG. 12, there is provided a flowchart which summarizes the operation of each module 105-107, 113, 114. To avoid confusion, the process 1200 is described with respect to communications in a single direction. For example, in the case of module 105, the single direction could involve data transmitted from client computer 101 to hub 108. In practice however, the modules 105-107, 113, 114 may likely operate bi-directionally. The process begins at step 1202 when the module is powered up and continues to step 1204 where module application software is initialized for executing the methods described herein. In step 1206, at least one mission plan is loaded from a memory location within the module. At this point, the module is ready to begin processing data and proceeds to do so at step 1208, where it accesses a data packet from an input data buffer of the module. In step 1210, the module checks to determine if it is in a bypass mode of operation. If so, the data packet accessed in step 1208 is retransmitted in step 1212 without any modification of the data packet. If the module is not in bypass mode, then it must be in its active mode of operation and continues on to step 1214. In step 1214, the module reads the data packet to determine the identity of a source node from which the data packet originated. In step 1216, it examines the packet to determine if the source node is valid. The specified source node can be compared to a list of valid nodes to determine if the specified source node is currently valid. If it is not a valid node then the packet is discarded in step 1218. In step 1220, the process checks to determine if a trigger event occurred. The occurrence of a trigger event will influence the selection of false IDP values to use. Accordingly, in step 1222, the module determines the false IDP values to use based on one or more of the trigger information, clock time and mission plan. The module then continues to step 1226 where it manipulates IDPs of the data packet. Once manipulations are complete, the data packet is re-transmitted to an adjacent node from the output port of the module. In step 1230, a determination is made as to whether the module has been commanded to power down. If so, the process ends at step 1232. In step 1208, the process continues and the next data packet is accessed from the module's input data buffer.

Enterprise Mission Management

Figure 13:
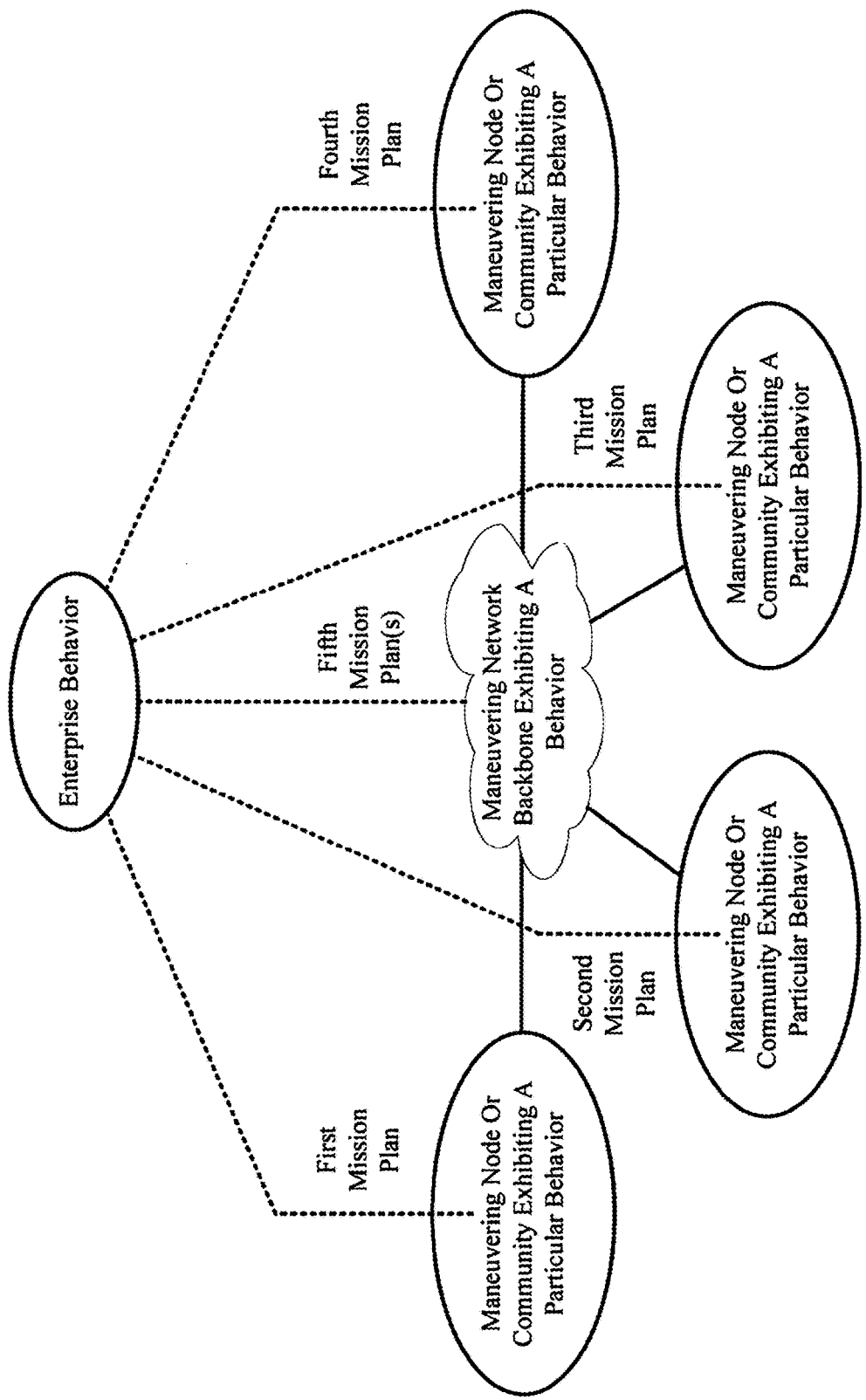
FIG. 13 is a schematic illustration that is useful for understanding an overall enterprise behavior of a computer network.
Figure 14:
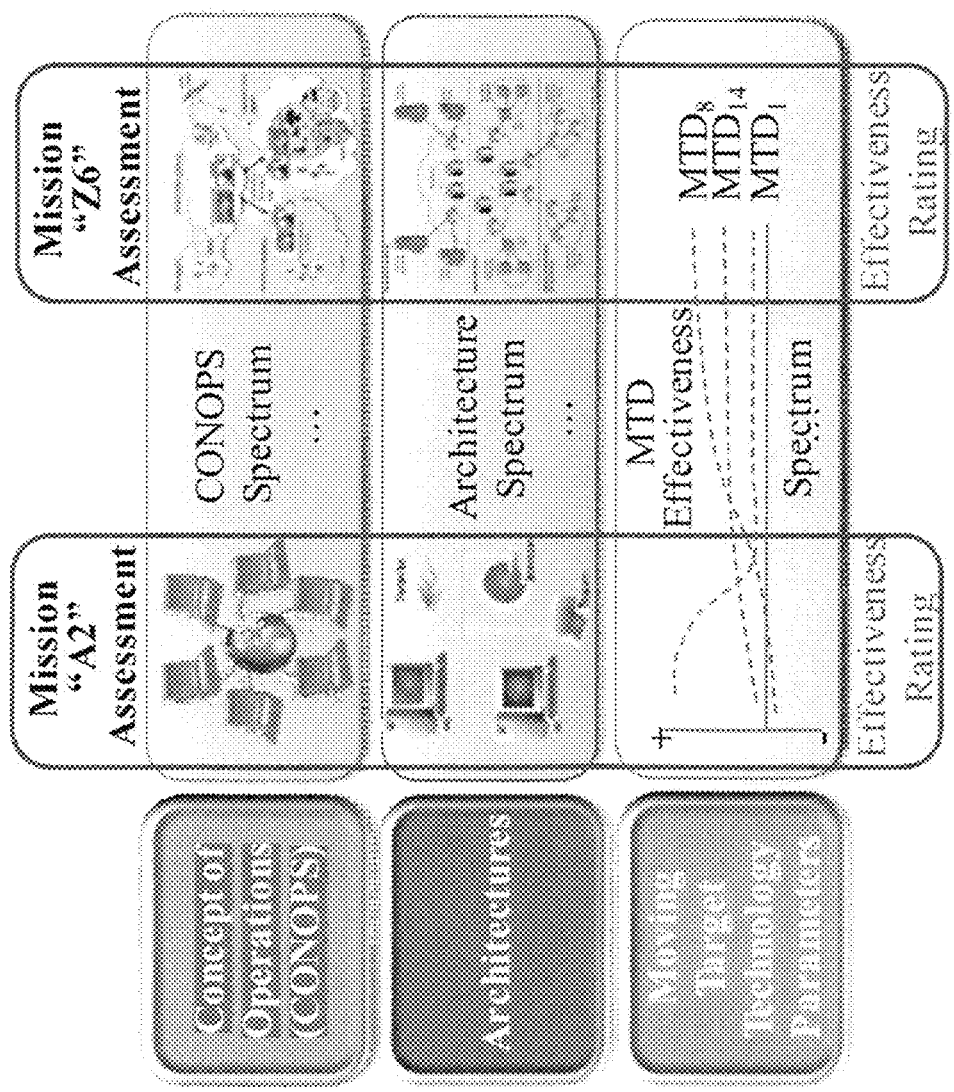
FIG. 14 is a schematic illustration that is useful for understanding enterprise mission management.

The overall behavior of a maneuvering computer network (e.g., computer network 100 of FIG. 1) is managed from an enterprise point of view such that the computer network operates in accordance with enterprise CONOPS, as well as mission CONOPS. In this regard, the overall behavior of the computer network is defined by the summation of the module behaviors as specified in the mission plans implemented within the computer network, as shown in FIG. 13. Accordingly, the NCSA manages the distribution and control of mission plans to endpoints or endpoint areas of the computer network based on an analysis of the relationships between various layers defining the overall enterprise objectives/rules/policies, as well as the computer network architecture. As shown in FIG. 14, the layers can include, but are not limited to, a CONOPS layer, a network architecture layer, and a moving target technology parameter layer.

As noted above, the enterprise mission management is tied to the access control techniques being employed by the computer network 100. For example, in smart card scenarios, the enterprise mission management is tied to users and their smart cards. More specifically, mission plans are distributed to modules and/or activated by users assigned to the corresponding missions via the smart cards. In this regard, the smart cards include, but are not limited to, user authentication information, access right verification information, mission identification information, mission plan identification information, mission plan(s), and/or mission plan cryptographic information. The manner in which enterprise mission management can be at least partially controlled by various access control techniques will be described further below in relation to FIGS. 15A-B.

Figure 15A:
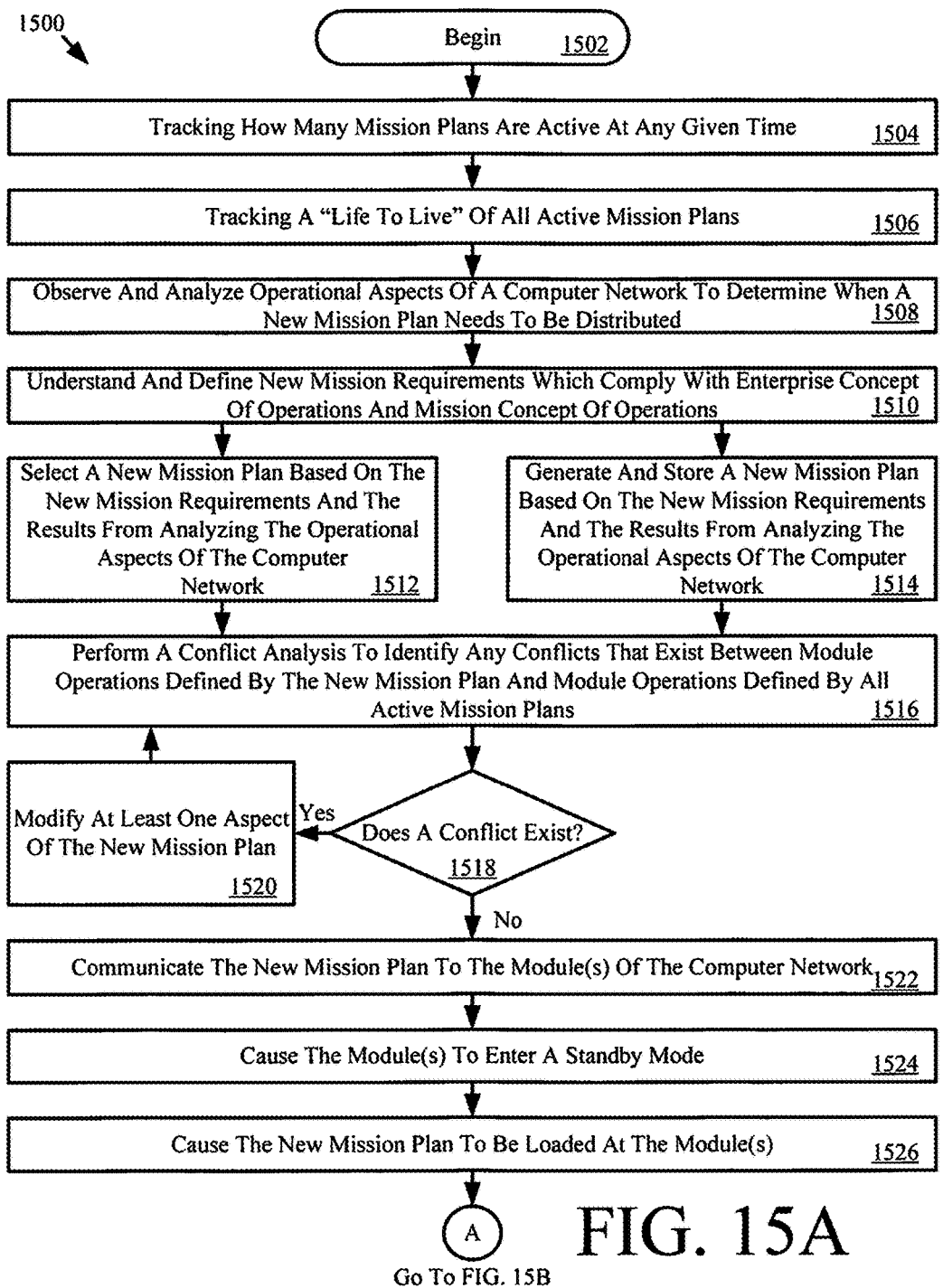
FIGS. 15A and 15B collectively provide a flow diagram of an exemplary method for enterprise mission management of a dynamic computer network.
Figure 15B:
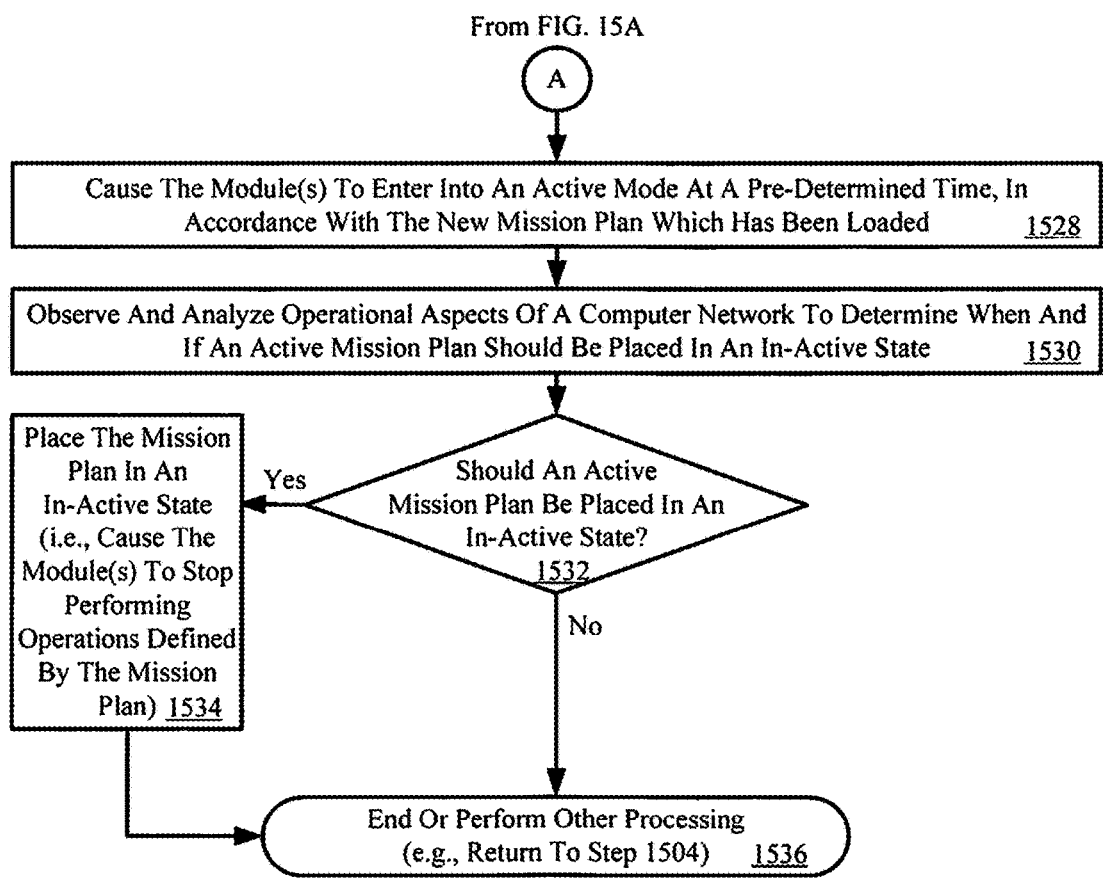

Referring now to FIGS. 15A-B, there is provided a flow diagram of an exemplary method 1500 for enterprise mission management of a dynamic computer network. Method 1500 begins with step 1502 and continues to steps 1504-1506, where tracking operations are performed by the NCSA. The tracking operations involve: tracking the number of mission plans that are active at any given time; and tracking a "life to live" of all active mission plans.

Next in step 1508, the NCSA performs operations to observe and analyze aspects of a computer network (e.g., computer network 100 of FIG. 1). These operations are performed for determining when a new mission plan needs to be distributed. Accordingly, these operations can include, but are not limited to, one or more of the following operations: packet inspection operations; congestion level based operations; network state based operations; user activity based operations; and network attack based operations.

In some scenarios, the packet inspection operations involve: analyzing a packet to obtain information identifying an origin of the packet, a destination of the packet, a group to which the origin or destination belongs, and/or a type of payload contained in the packet; analyzing a packet to determine whether a code word is contained therein; comparing the information obtained from the packet with information stored in a data store to determine if a match exists; and/or determining whether a trigger event has occurred for distributing a new mission plan, based on the results of the comparing.

In some scenarios, the congesting level based operations involve: monitoring the level of congestion within the computer network; tracking the level of congestion within the computer network; and/or comparing a current level of congestion with a threshold value to determine if a trigger event has occurred for distributing a new mission plan.

In some scenarios, the network state based operations involve: monitoring a state of the computer network; tracking the state of the computer network; analyzing the computer network to determine a state thereof; and determining if a trigger event has occurred for distributing a new mission plan based on the results of the analysis.

In some scenarios, the user activity based operations involve: monitoring user activities within the computer network; collecting information about the user activities; analyzing the collected information to determine if a certain protocol pattern exists; and determining if a trigger event has occurred for distributing a new mission plan based on the results of the analysis.

In some scenarios, the network attack based operations involve: monitoring attack events within the computer network; tracking attack events within the computer network; performing LUT operations to determine a level of an attack and/or the type of attack on the computer network; and determining if a trigger event has occurred for distributing a new mission plan based on the results of the LUT operations.

Referring again to FIG. 15A, method 1500 continues with step 1510 where the NCSA performs operations to understand and define new mission requirements which comply with enterprise and mission CONOPS. In this regard, the NCSA determines the module(s) to which the new mission plan(s) should be distributed. Subsequently, step 1512 or 1514 is performed.

Step 1512 involves selecting a new mission plan from a plurality of pre-stored mission plans based on the new mission requirements and the results from analyzing the operations aspects of the computer network. For example, if a Level 1 attack is detected, then a first mission plan is selected. In contrast, if a Level 5 attack is detected, then a second different mission plan is selected.

Step 1514 involves generating and storing a new mission pan. The new mission plan can be generated manually by a network administration or automatically by the NCSA, as described above. In all scenarios, the new mission plan can be generated based on the new mission requirements and the results from analyzing the operational aspects of the computer network. For example, a timing scheme, a pseudo-random function and/or a chaotic function for a mission plan can be selected at least partially based on the type of trigger event detected in step 1508, the content contained in a packet, the current congestion level of the computer network, the current state of the computer network, the type of user activity within the computer network, the level of an attack detected on the computer network, and/or the type of attack detected on the computer network.

Once the new mission plan has been selected or generated, step 1516 is performed by the NCSA. In step 1516, the NCSA performs a conflict analysis, such as that described above, to identify any conflicts that exist between module operations defined by the new mission plan and module operations defined by all active mission plans. If the NCSA determines that a conflict does exist [1518:YES], then the new mission plan is modified as shown by step 1520. Thereafter, the conflict analysis is performed using the modified mission plan. If the NCSA determines that a conflict does not exist [1518:NO], then step 1522 is performed where the new mission plan is: (a) communicated to the module(s) of the computer network, where the mission plan is stored in a memory location (e.g., so as to be associated with a particular mission plan identifier and/or at least one user identifier); and/or (b) a mission model identifier is stored in a data store of a smart card. Alternatively, the mission plan could be communicated to one or more smart cards such that the mission plan can be downloaded directly from the smart cards to the module(s), as described above.

When the network administrator, the NCSA and/or a user of a client computer is ready to implement the new mission plan, a command is sent in step 1524 which causes the module(s) to enter a standby mode as described herein. While the module(s) is(are) in this standby mode, the mission plan is loaded at the module(s) at step 1526. In this regard, the mission plan can be pre-stored in the module(s). In this scenario, the mission plan is simply loaded from the internal memory location to where the mission plan was previously downloaded. Alternatively, if the mission plan was not previously downloaded, the mission plan can be downloaded to a data store thereof from a remote data store of the computer network or from a data store of the smart card. Subsequently, the module loads the mission plan data from the internal memory location to where the mission plan was just downloaded. Loading of the mission plan data occurs at the module(s) so that the mission plan can be used to control the operations of an application software executing on the module(s). In particular, the mission plan is used to control the way in which the application software performs dynamic manipulations of IDPs. Upon completing step 1526, method 1500 continues with step 1528 of FIG. 15B.

In step 1528, the module(s) is(are) again caused to enter into an active operational mode in which the module(s) perform(s) manipulations of IDPs in accordance with the mission plan. Steps 1524, 1526 and 1528 can occur in response to specific commands sent from a network administrator, the NCSA and/or the smart card. Alternatively, steps 1524, 1526 and 1528 can occur automatically at the module(s) in response to receiving the mission plan in step 1522.

After step 1528, the module(s) continue(s) performing processing in accordance with the mission plan which has been loaded. In step 1530, method 1500 continues by observing and analyzing operational aspects of the computer network to determine when and if an active mission plan should be placed in an in-active state. For example, if the network administrator and/or NCSA determines or suspects that an adversary has discovered an active mission plan for the computer network, then it may be desirable to change the mission plan so as to maintain the security of the computer network.

If the NCSA determines that none of the active mission plans should be placed in an in-active state [1532:NO], step 1536 is performed, which will be described below. In contrast, if the NCSA determines that an active mission plan should be placed in an in-active state [1532:YES], step 1534 is performed where the mission plan is placed in an in-active state (i.e., cause the module(s) to stop performing operations defined by the mission plan). Thereafter, step 1536 is performed where method 1500 ends or other processing is performed (e.g., method 1500 returns to step 1504).

The other processing of step 1536 can involve re-configuring the computer network to operate in accordance with at least one other mission plan which is intended to maintain the security of the computer network. In the access control scenarios (e.g., smart card scenarios), identification information of the other mission plan is stored in a centralized data store of the computer network or in a data store of the modules so as to be associated with the corresponding mission, individual users assigned to the corresponding mission, and/or mission plan which is being replaced by the other mission plan. Accordingly, when the users subsequently login to the client computers (e.g., via their smart cards), the correct mission plan is activated at the respective modules based on information obtained from the users (e.g., via user-software interactions) and/or the smart cards. This information can include, but is not limited to, a mission identifier, a user identifier, a user login name, a user login password, and/or a mission plan identifier.

Figure 16:
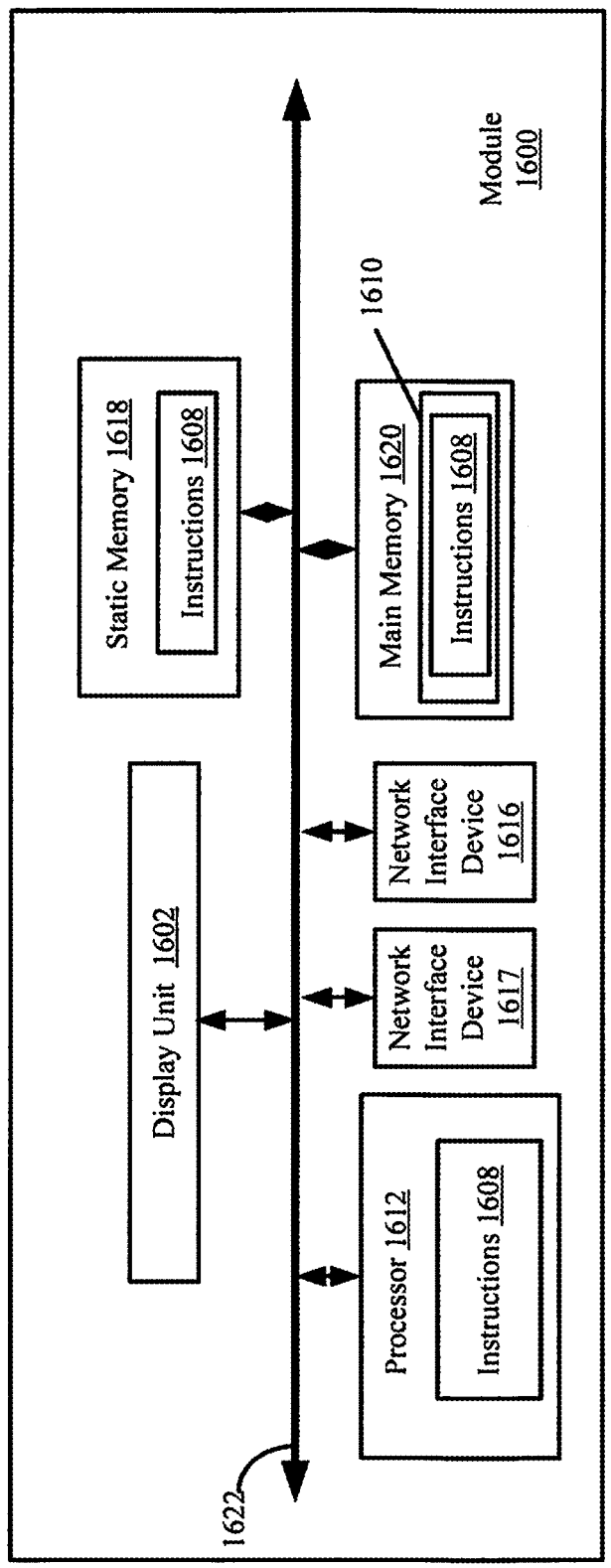
FIG. 16 is a block diagram of a computer architecture that can be used to implement the modules in FIG. 1.

Referring now to FIG. 16, there is provided a block diagram which shows a computer architecture of an exemplary module 1600 which can be used for performing the manipulation of IDPs described herein. The module 1600 includes a processor 1612 (such as a Central Processing Unit ("CPU")), a main memory 1620 and a static memory 1618, which communicate with each other via a bus 1622. The module 1600 can further include a display unit 1602, such as a Liquid Crystal Display ("LCD") to indicate the status of the module. The module 1600 can also include one or more network interface devices 1616, 1617 which allow the module to receive and transmit data concurrently on two separate data lines. The two network interface ports facilitate the arrangement shown in FIG. 1, where each module is configured to concurrently intercept and re-transmit data packets received from two separate computing devices on the network.

The main memory 1620 includes a computer-readable storage medium 1610 on which is stored one or more sets of instructions 1608 (e.g., software code) configured to implement one or more of the methodologies, procedures, or functions described herein. The instructions 1608 can also reside, completely or at least partially, within the static memory 1618, and/or within the processor 1612 during execution thereof by the module. The static memory 1618 and the processor 1612 also can constitute machine-readable media. In the various embodiments of the present invention, a network interface device 1616 connected to a network environment communicates over the network using the instructions 1608.

Figure 17:
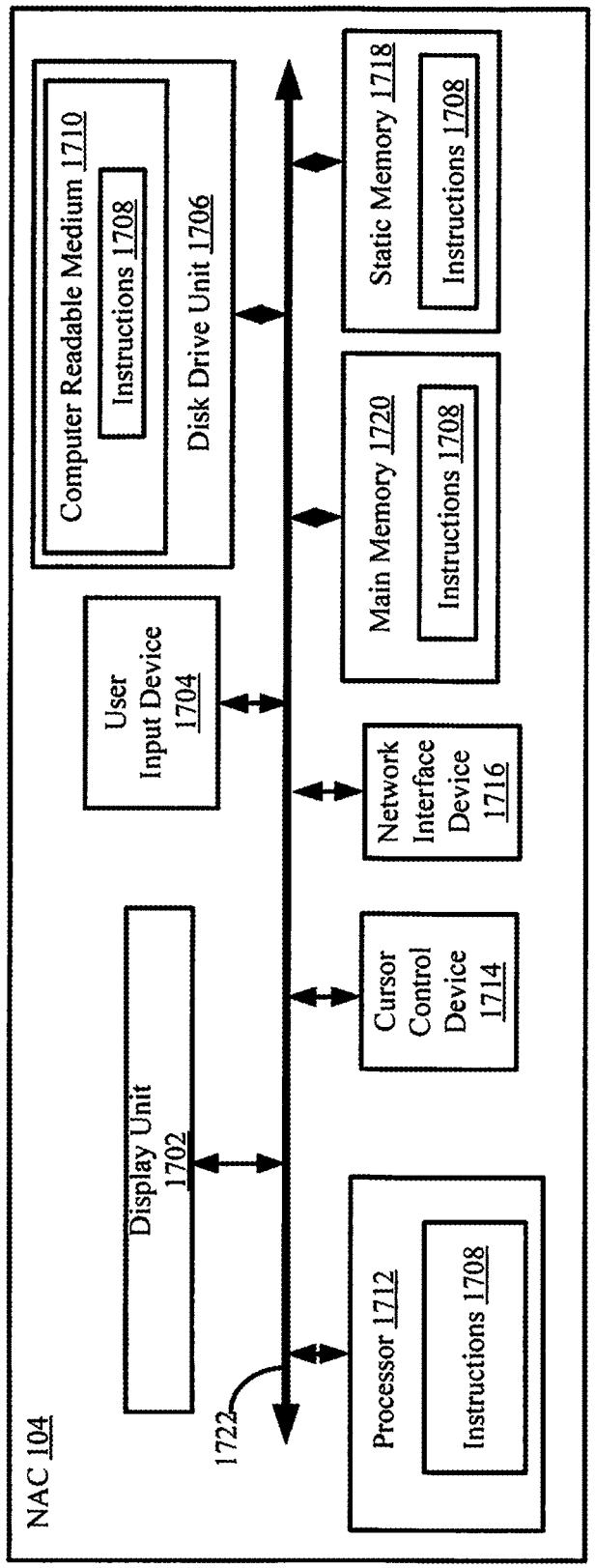
FIG. 17 is a block diagram of a computer architecture that can be used to implement a Network Administration Computer ("NAC") shown in FIG. 1.

Referring now to FIG. 17, there is shown an exemplary NAC 104 in accordance with the inventive arrangements. The NAC 104 can comprise various types of computing systems and devices, including a server computer, a client user computer, a Personal Computer ("PC"), a tablet PC, a laptop computer, a desktop computer, a control system or any other device capable of executing a set of instructions (sequential or otherwise) that specifies actions to be taken by that device. Further, while a single computer is illustrated in FIG. 17, the phrase "NAC" shall be understood to include any collection of computing devices that individually or jointly execute a set (or multiple sets) of instructions to perform any one or more of the methodologies discussed herein.

Referring now to FIG. 17, the NAC 104 includes a processor 1712 (such as a CPU), a disk drive unit 1706, a main memory 1720 and a static memory 1718, which communicate with each other via a bus 1722. The NAC 104 can further include a display unit 1702, such as a video display (e.g., an LCD), a flat panel, a solid state display, or a Cathode Ray Tube ("CRT"). The NAC 104 can include a user input device 1704 (e.g., a keyboard), a cursor control device 1714 (e.g., a mouse) and a network interface device 1716.

The disk drive unit 1706 includes a computer-readable storage medium 1710 on which is stored one or more sets of instructions 1708 (e.g., software code) configured to implement one or more of the methodologies, procedures, or functions described herein. The instructions 1708 can also reside, completely or at least partially, within the main memory 1720, the static memory 1718, and/or within the processor 1712 during execution thereof. The main memory 1720 and the processor 1712 also can constitute machine-readable media.

Those skilled in the art will appreciate that the module architecture illustrated in FIG. 16 and the NAC architecture in FIG. 17, each represent merely one possible example of a computing device that can be used respectively for performing the methods described herein. However, the invention is not limited in this regard and any other suitable computing device architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

While the computer-readable storage medium 1610, 1710 is shown in FIGS. 16 and 17 to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but is not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Types of IDPs that can be Varied

Referring now to FIG. 18, there is provided a list of some of the IDPs that can be manipulated by the modules 105-107, 113, 114 and/or by bridge 115. Each of the parameters listed in FIG. 18 is included in a data communication included in a network using a TCP/IP communication protocol. More specifically, each of the listed parameters is contained in a header portion of a data packet, as is well known in the art. Embodiments of the present invention are not limited in this regard. The IDPs can additionally or alternatively include information that is contained in a payload portion of a data packet and/or a trailer portion of a data packet. Most of the information types listed in FIG. 18 are well known to those skilled in the art. However, a brief description of each type of information and its use as an IDP is provided herein. Also provided is a brief discussion of the ways in which each IDP can be manipulated.

IP Address. An IP Address is a numerical identifier assigned to each computing device participating in a computer network where the network uses the well known Internet Protocol for communication. The IP address can be a thirty two bit or one hundred twenty eight bit number. For purposes of the present invention, the IP address number can be changed to a false value that is selected randomly (e.g., using a pseudorandom number generator). Alternatively, the false IP address value can be randomly selected from a predetermined list of false values (e.g., a list specified by a mission plan). The source and destination IP addresses are included in header portion of a data packet. Accordingly, manipulation of these values is performed by simply changing by using packet manipulation techniques which change the IP header information. When the packet arrives at a second module (the location of which can be manipulated), the false IP address values are transformed back to their true values. The second module uses the same pseudorandom process (or its inverse) to derive the true IP address value based on the false value.

MAC Address. A MAC address is a unique value assigned to a network interface device by a manufacturer and stored in an onboard ROM. For purposes of the present invention, the source and/or destination MAC address can be changed to a false value that is selected randomly (e.g., using a pseudorandom number generator). Alternatively, the false MAC value can be randomly selected from a predetermined list of false values (e.g., a list specified by a mission plan). The source and destination MAC addresses are included in header portion of data packet. Accordingly, manipulation of these values is performed by simply changing an Ethernet header information of each packet. When the packet arrives at a second module (the location of which can be manipulated), the false MAC address values are transformed back to their true values. A module receiving a packet will use the same pseudorandom process (or its inverse) to derive the true MAC address value based on the false value.

Network/Subnet. In some embodiments, the IP address can be thought of as a single IDP. However, an IP address is generally defined as including at least two parts which include a network prefix portion and a host number portion. The network prefix portion identifies a network to which a data packet is to be communicated. The host number identifies the particular node within a Local Area Network ("LAN"). A sub-network (sometimes referred to as a subnet) is a logical portion of an IP network. Where a network is divided into two or more sub-networks, a portion of the host number section of the IP address is used to specify a subnet number. For purposes of the present invention, the network prefix, the subnet number and the host number can each be considered to be a separate IDP. Accordingly, each of these IDPs can be separately manipulated independently of the others in a pseudorandom way. Moreover, it will be appreciated that a data packet will include a source IP address and a destination IP address. Accordingly, the network prefix, the subnet number and host number can be manipulated in the source IP address and/or the destination IP address, for a total of six different variable IDPs that can be manipulated in a pseudorandom way. A module receiving a packet will use the same pseudorandom process as an originating node (or the inverse of such process) to derive the true Network/subnet information value based on the false value.

TCP Sequence. Two client computers communicating with each other on opposite sides of a TCP session will each maintain a TCP sequence number. The sequence number allows each computer to track how much data it has communicated. The TCP sequence number is included in the TCP header portion of each packet which is communicated during the session. At the initiation of a TCP session, the initial sequence number value is randomly selected. For purposes of the present invention, the TCP sequence number can be manipulated as an IDP in accordance with a pseudorandom process. For example, the TCP sequence number can be changed to a false value that is selected randomly (e.g., using a pseudorandom number generator). When the packet is received at a different module of the network (the location of which will be dynamically varied), the TCP sequence number can be transformed from a false value back to a true value, using an inverse of the pseudorandom process.

Port Number. A TCP/IP port number is included in the TCP or UDP header portion of a data packet. Ports as used in the TCP/IP communication protocol are well known in the art and therefore will not be described herein in detail. The port information is contained within the TCP header portion of the data packet. Accordingly, manipulation of the port information is accomplished by simply modifying the TCP header information to change a true port value to a false port value. As with the other IDPs discussed here, the port number information can be manipulated or transformed to a false value in accordance with a pseudorandom process at a first module. The port information can later be transformed from a false value to a true value at a second module, using an inverse of the pseudorandom process.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for configuring a computer network, the method comprising:
receiving first access control information input to a first network node of the computer network by a first user assigned to a first mission, said first access control information comprising user authentication information required for obtaining access to the first network node;
verifying that the first user of the first network node has a right to have access to the computer network based on the first access control information;
granting the first user access to the computer network in response to the verifying;
obtaining first mission related information by the first network node in response to the first user being granted access to the computer network, the first mission related information associated with the first user and at least identifying a first mission plan specifying a manner in which an assigned value for at least one first identity parameter is to be dynamically modified by at least one node of the computer network;
configuring the first network node or a second network node of the computer network to operate in accordance with the first mission plan during a first time period;
obtaining second mission related information based on second access control information input to the first network node by a second user; and
re-configuring the first network node or the second network node to operate in accordance with the second mission related information during a second time period, the second mission related information at least identifying a second mission plan that is different from the first mission plan;
wherein configuration and re-configuration of the first or second network node's mission specific operations are tied to at least one access control technique employed by the first or second network node.

2. The method according to claim 1, wherein the first network node is a client computer capable of configuring the second network node so as to operate in accordance with the first mission plan.

3. The method according to claim 1, wherein the first network node is a network device communicatively coupled to at least one client computer and configurable to operate in accordance with the first mission plan.

4. The method according to claim 1, wherein the first access control information is input by the user via a user-software interaction or via a smart card reader.

5. The method according to claim 1, wherein the first mission related information is obtained from a smart card.

6. The method according to claim 5, wherein the first mission related information comprises at least one of an identifier of a mission for which the first mission plan was generated, an identifier of the first mission plan, an identifier of the first user, the first mission plan, and a cryptographic key for decrypting the first mission plan.

7. The method according to claim 6, further comprising retrieving the first mission plan or at least configuration data of the first mission plan from a data store based on the first mission related information, where the data store is local to or remote from the first or second network node.

8. The method according to claim 7, further comprising decrypting the first mission plan prior to configuring the computer network to operate in accordance therewith.

9. The method according to claim 1, further comprising:
storing the first mission related information on a smart card when the first user is assigned to the first mission; and
storing second mission related information on the smart card when the first user is assigned to a second different mission, the second mission related information at least identifying a second mission plan specifying a manner in which an assigned value for at least one second identity parameter is to be dynamically modified by at least one node of the computer network.

10. The method according to claim 1, further comprising:
terminating the first user's access to the computer network;
receiving the second access control information input to the first network node of the computer network by the second user assigned to the second mission;
verifying that the second user has a right to have access to the computer network based on the second access control information; and granting the second user access to the computer network in response to the verifying;

wherein the second mission related information is associated with the second user and the second mission plan specifies a manner in which an assigned value for at least one second identity parameter is to be dynamically modified by at least one node of the computer network.

11. A computer network, comprising:
a first network node operative to:
  receive first access control information input by a first user assigned to a first mission, said first access control information comprising user authentication information required for obtaining access to the first network node;
  verify that the first user of the first network node has a right to have access to the computer network based on the first access control information;
  grant the first user access to the computer network in response to the verifying;
  obtain first mission related information by the first network node in response to the first user being granted access to the computer network, the first mission related information associated with the first user and at least identifying a first mission plan specifying a manner in which an assigned value for at least one first identity parameter is to be dynamically modified by at least one node of the computer network;
  configure the first network node or a second network node of the computer network to operate in accordance with the first mission plan;
  obtain second mission related information based on second access control information input to the first network node by a second user; and
  re-configuring the first network node or the second network node to operate in accordance with the second mission related information during a second time period, the second mission related information at least identifying a second mission plan that is different from the first mission plan;
  wherein configuration and re-configuration of the first or second network node's mission specific operations are tied to at least one access control technique employed by the first or second network node.

12. The computer network according to claim 11, wherein the first network node is a client computer capable of configuring the second network node so as to operate in accordance with the first mission plan.

13. The computer network according to claim 11, wherein the first network node is a network device communicatively coupled to at least one client computer and configurable to operate in accordance with the first mission plan.

14. The computer network according to claim 11, wherein the first access control information is input by the user via a user-software interaction or via a smart card reader.

15. The computer network according to claim 11, wherein the first mission related information is obtained from a smart card.

16. The computer network according to claim 15, wherein the first mission related information comprises at least one of an identifier of a mission for which the first mission plan was generated, an identifier of the first mission plan, an identifier of the first user, the first mission plan, and a cryptographic key for decrypting the first mission plan.

17. The computer network according to claim 16, wherein the first network node is further operative to retrieve the first mission plan or at least configuration data of the first mission plan from a data store based on the first mission related information, where the data store is local to or remote from the first or second network node.

18. The computer network according to claim 17, wherein the first mission plan is decrypted by the first network node or the smart card prior to when the first or second network node is configured to operate in accordance with the first mission plan.

19. The computer network according to claim 11, further comprising a third network node operative to:
  store the first mission related information on a smart card when the first user is assigned to the first mission; and
  store second mission related information on the smart card when the first user is assigned to a second different mission, the second mission related information at least identifying a second mission plan specifying a manner in which an assigned value for at least one second identity parameter is to be dynamically modified by at least one node of the computer network.

20. The computer network according to claim 11, wherein the first network node is further operative to:
  terminate the first user's access to the computer network;
  receive the second access control information input by the second user assigned to a second mission;
  verify that the second user has a right to have access to the computer network based on the second access control information; and
  grant the second user access to the computer network in response to the verifying;
  wherein the second mission related information is associated with the second user and the second mission plan specifies a manner in which an assigned value for at least one second identity parameter is to be dynamically modified by at least one node of the computer network.

* * * * *